US011732659B2

(12) United States Patent
Swann et al.

(10) Patent No.: US 11,732,659 B2
(45) Date of Patent: Aug. 22, 2023

(54) CONTROLLING SOOT

(71) Applicant: ROLLS-ROYCE plc, London (GB)

(72) Inventors: Peter Swann, Derby (GB);
Christopher P Madden, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/896,467

(22) Filed: Aug. 26, 2022

(65) Prior Publication Data
US 2023/0080006 A1 Mar. 16, 2023

(30) Foreign Application Priority Data

Sep. 6, 2021 (GB) ...................... 2112641

(51) Int. Cl.
*F02C 9/50* (2006.01)
*F02C 9/16* (2006.01)
*F23R 3/34* (2006.01)
*F23R 3/26* (2006.01)
*F23C 7/00* (2006.01)

(52) U.S. Cl.
CPC ................. *F02C 9/50* (2013.01); *F02C 9/16* (2013.01); *F23C 7/008* (2013.01); *F23R 3/26* (2013.01); *F23R 3/343* (2013.01); *F05D 2270/082* (2013.01)

(58) Field of Classification Search
CPC ............... F23R 3/26; F23C 7/008; F02C 9/16
See application file for complete search history.

(56) References Cited

U.S. PATENT DOCUMENTS

| 2,780,055 A * | 2/1957 | Bristol, Jr. ............... F02K 3/10 251/20 |
| 3,423,930 A * | 1/1969 | Moore, Jr. ............... F02C 7/22 60/39.281 |
| 4,412,414 A | 11/1983 | Novick et al. |
| 5,069,029 A | 12/1991 | Kuroda et al. |

(Continued)

FOREIGN PATENT DOCUMENTS

DE 3819898 A1 * 12/1989
EP 2 677 138 A2 12/2013

OTHER PUBLICATIONS

Jun. 13, 2022 Search Report issued in British Patent Application No. 2112642.0.
Liu, Yize et al., "Review of modern low emissions combustion technologies for aero gas turbine engines", Progress in Aerospace Sciences, vol. 94, 2017.

(Continued)

*Primary Examiner* — Todd E Manahan
*Assistant Examiner* — Marc J Amar
(74) *Attorney, Agent, or Firm* — Oliff PLC

(57) ABSTRACT

A gas turbine engine comprising a variable geometry combustor having pilot fuel injectors and main fuel injectors; a fuel metering system configured to control fuel flow to the pilot fuel injectors and the main fuel injectors; a variable geometry airflow arrangement for the variable geometry combustor, which is configured to vary the airflow through the pilot fuel injectors and/or the main fuel injectors; a control system configured to control the variable geometry airflow arrangement in dependence upon airflow delivered to the combustor, the fuel flow to the pilot fuel injectors and the main fuel injectors, and a target index of soot emissions, thereby controlling airflow through the pilot fuel injectors and/or the main fuel injectors and hence the quantity of soot produced by combustion.

19 Claims, 14 Drawing Sheets

(56) References Cited

U.S. PATENT DOCUMENTS

| | | | | |
|---|---|---|---|---|
| 5,207,064 | A * | 5/1993 | Ciokajlo | F23R 3/34 60/737 |
| 5,490,378 | A * | 2/1996 | Berger | F23R 3/14 60/39.23 |
| 5,636,510 | A * | 6/1997 | Beer | F23R 3/14 60/39.23 |
| 5,673,552 | A * | 10/1997 | Idleman | F23C 7/004 60/39.23 |
| 6,158,223 | A * | 12/2000 | Mandai | F23R 3/286 60/737 |
| 6,199,367 | B1 * | 3/2001 | Howell | F23R 3/14 60/39.23 |
| 6,263,663 | B1 * | 7/2001 | Grienche | F23R 3/26 60/794 |
| 2011/0300493 | A1 | 12/2011 | Mittricker et al. | |
| 2015/0284102 | A1 * | 10/2015 | Swann | B64D 33/04 701/3 |
| 2015/0345791 | A1 * | 12/2015 | Whiteman | F23R 3/346 60/734 |
| 2017/0241337 | A1 * | 8/2017 | Mokheimer | F02C 7/224 |
| 2019/0032559 | A1 | 1/2019 | Dai et al. | |
| 2019/0353350 | A1 * | 11/2019 | Bellis | F23R 3/14 |

OTHER PUBLICATIONS

May 26, 2020 Search Report issued in British Patent Application No. 2003095.3.
Mar. 29, 2022 Office Action issued in U.S. Appl. No. 17/189,663.
Mar. 29, 2022 Office Action issued in U.S. Appl. No. 17/189,650.
Aug. 20, 2020 Search Report issued in British Patent Application No. 2003094.6.
Jul. 16, 2021 Extended Search Report issued in European Patent Application No. 21155908.3.
Jul. 8, 2021 Extended Search Report issued in European Patent Application No. 21155907.5.
U.S. Appl. No. 17/896,442, filed Aug. 26, 2022 in the name of Peter Swann.
Jun. 15, 2022 Search Report issued in British Patent Application No. 2112641.2.
Mellor, A.M., "Gas Turbine Engine Pollution", Progress in Energy and Combustion Science, vol. 1, 1976.
Feb. 1, 2023 Extended Search Report issued in European Patent Application No. 22191701.6.
Feb. 1, 2023 Extended Search Report issued in European Patent Application No. 22191700.8.

* cited by examiner

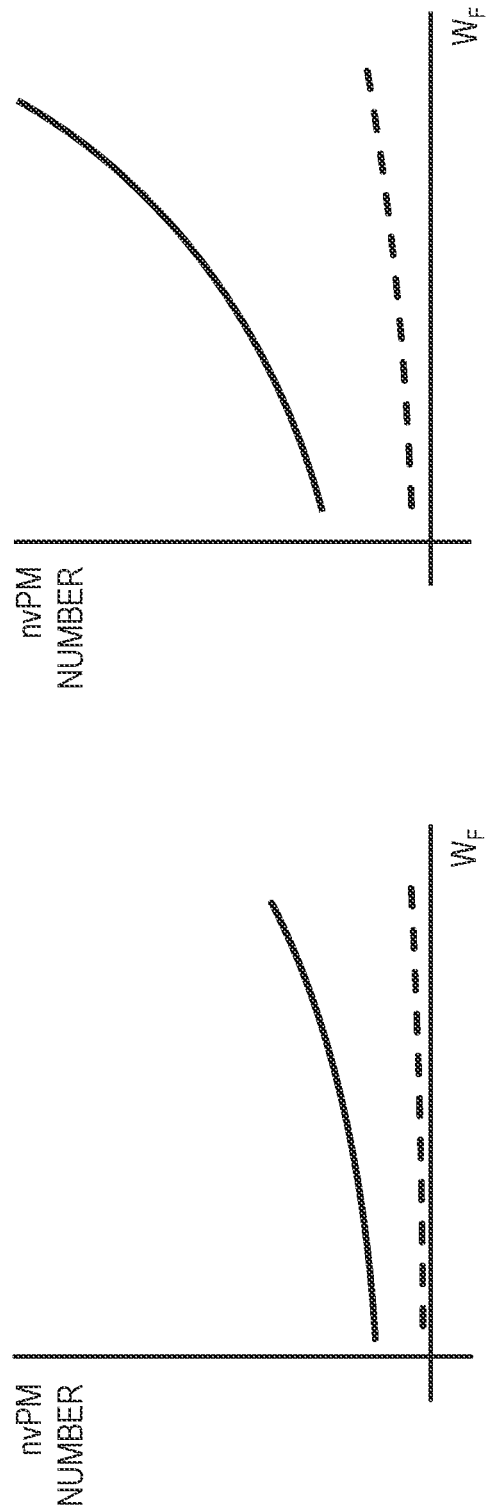

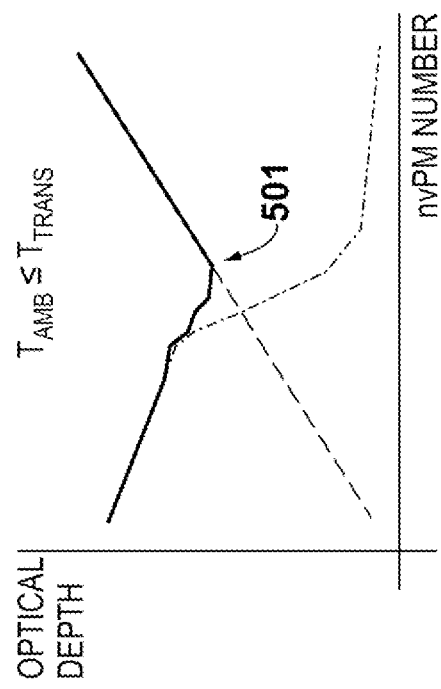
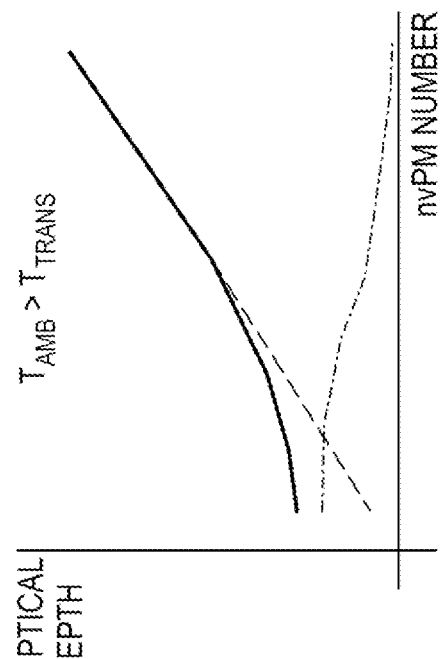

CONTROLLING SOOT

CROSS-REFERENCE TO RELATED APPLICATIONS

This specification is based upon and claims the benefit of priority from UK Patent Application Number 2112641.2 filed on 6 Sep. 2021, the entire contents of which are incorporated herein by reference.

BACKGROUND

Field of the Disclosure

This disclosure relates to aircraft gas turbine engines with variable geometry combustors, and methods of operation thereof.

Description of the Related Art

Combustion of hydrocarbon fuels in aero engine combustion systems produces a hot exhaust stream composed primarily of nitrogen, oxygen, carbon dioxide and water vapour. In addition to these major components, a quantity of soot is also produced in locally-rich flame zones, along with thermal nitrogen oxides and sulphur oxides. Unburnt hydrocarbons and carbon monoxide may also be emitted in very low concentrations, together with trace quantities of other particulates.

The emission of a warm, moist exhaust plume into the cold ambient air found at typical flight levels can, under certain circumstances, result in the formation of condensation trails (also known as vapour trails or, as used hereinafter, by the contraction contrails). Application of the well-established Schmidt-Appleman criterion is indicative of whether a contrail can form, and in essence requires that the ambient temperature is below a threshold temperature. This threshold temperature is a function of ambient relative humidity over water and the gradient of a line representing the mixing process from the exhaust plume to ambient conditions in terms of water vapour partial pressure and temperature.

Microphysical analysis indicates that, for current fuel compositions and combustion technologies, the mechanisms of ice crystal formation depend principally upon emissions of soot. Initially-dry soot particles become activated by adsorption of oxidised sulphur, leading to scavenging of water molecules when relative humidity over water is in excess of 100 percent. Following this, immersion freezing occurs, producing an ice nucleus. Further depositional growth of the ice crystals may then proceed, in dependence upon the amount of water vapour, initially in the exhaust plume and subsequently in ambient air.

If ambient air is not supersaturated with respect to ice, then as the plume continues to mix out, ice mass is lost via sublimation and the contrail disappears. However, if ambient air is supersaturated with respect to ice, then the contrail may continue to exist for a substantial period of time and is termed a persistent contrail. These initially-linear contrails eventually spread out to form cirrus, and together are known as aviation-induced cloudiness.

Some modern aero engine combustors inject fuel in such a way that the fuel-air ratio is predominantly lean; thus there are substantially no rich zones in the flame and thus little or no soot forms. Whilst this may appear to solve the issue of contrail formation—contrails are seen by many as having an undesirable effect in terms of global heating—it does not take into account the desirable impact that contrails can have on the planet's albedo.

SUMMARY

The invention is directed towards variable geometry combustor systems for gas turbine engines, and methods of operation thereof.

In an aspect, such a gas turbine engine, which may be for an aircraft installation, comprises:
 a variable geometry combustor having pilot fuel injectors and main fuel injectors;
 a fuel metering system configured to control fuel flow to the pilot fuel injectors and the main fuel injectors;
 a variable geometry airflow arrangement for the variable geometry combustor, which is configured to vary the airflow through the pilot fuel injectors and/or the main fuel injectors;
 a control system configured to control the variable geometry airflow arrangement in dependence upon airflow delivered to the combustor, the fuel flow to the pilot fuel injectors and the main fuel injectors, and a target index of soot emissions, thereby controlling airflow through the pilot fuel injectors and/or the main fuel injectors and hence the quantity of soot produced by combustion.

In an embodiment, the control system is configured to derive the target index of soot emissions in dependence upon an atmospheric condition.

In an embodiment, the atmospheric condition is an atmospheric condition causative of a condensation trail, optionally a persistent condensation trail.

In an embodiment, the control system is configured to derive the target index of soot emissions by:
 identifying a condition to the effect that an optical depth of a condensation trail produced by the engine should be either reduced or increased;
 in response to identifying that the optical depth should be reduced, updating the target index of soot emissions so as to reduce ice particle formation
 in response to identifying that the optical depth should be increased, updating the target index of soot emissions so as to increase ice particle formation.

In an embodiment, the control system is configured to respond to an increase in the target index of soot emissions by controlling the variable geometry airflow arrangement to increase the airflow through the main fuel injectors relative to the airflow through the pilot fuel injectors.

In an embodiment, the control system is configured to respond to a decrease in the target index of soot emissions by controlling the variable geometry airflow arrangement to decrease the airflow through the main fuel injectors relative to the airflow through the pilot fuel injectors.

In an embodiment, the control system is further configured to control the fuel metering system to effect changes in the fuel flow to the pilot fuel injectors and the main fuel injectors in dependence upon the target index of soot emissions.

In an embodiment, the control system is configured to respond to an increase in the target index of soot emissions during operation of both the pilot fuel injectors and the main fuel injectors by:
 controlling the variable geometry airflow arrangement to increase the airflow through the main fuel injectors relative to the airflow through the pilot fuel injectors; and
 controlling the fuel metering system to increase fuel flow to the pilot fuel injectors relative to the main fuel injectors.

In an embodiment, the control system is configured to respond to a decrease in the target index of soot emissions during operation of both the pilot fuel injectors and the main fuel injectors by:

controlling the variable geometry airflow arrangement to decrease the airflow through the main fuel injectors relative to the airflow through the pilot fuel injectors; and controlling the fuel metering system to decrease fuel flow to the pilot fuel injectors relative to the main fuel injectors.

In an embodiment, the control system is configured to respond to a decrease in the target index of soot emissions during operation of only the pilot fuel injectors by:

controlling the variable geometry airflow arrangement to decrease the airflow through the main fuel injectors relative to the airflow through the pilot fuel injectors; and controlling the fuel metering system to decrease fuel flow from the pilot fuel injectors and introduce fuel flow to the main fuel injectors.

In an embodiment, the pilot fuel injectors are variable geometry pilot fuel injectors and comprise the variable geometry airflow arrangement, whereby variation of the airflow through the pilot fuel injectors varies the airflow through the main fuel injectors.

In an embodiment, the main fuel injectors are variable geometry main fuel injectors and comprise the variable geometry airflow arrangement, whereby variation of the airflow through the main fuel injectors varies the airflow through the pilot fuel injectors.

In an embodiment, the pilot fuel injectors are variable geometry pilot fuel injectors and the main fuel injectors are variable geometry main fuel injectors, whereby the pilot fuel injectors and the main fuel injectors comprise the variable geometry airflow arrangement.

In an embodiment, the gas turbine engine comprises a plurality of duplex fuel nozzles, each one of which comprises one of the pilot fuel injectors and one of the main fuel injectors.

In an embodiment, the combustor is a parallel staged combustor in which the pilot fuel injectors are configured to inject fuel into a first combustion zone and the main fuel injectors are configured to inject fuel into a second combustion zone radially offset from the first combustion zone.

In an embodiment, the combustor is a series staged combustor in which the pilot fuel injectors are configured to inject fuel into a first combustion zone and the main fuel injectors are configured to inject fuel into a second combustion zone axially offset from the first combustion zone.

In another aspect, a method of controlling an index of soot emissions of a gas turbine combustor is provided, comprising:

providing pilot fuel injectors for rich combustion and main fuel injectors for lean combustion in said combustor;

providing a variable geometry airflow arrangement for varying the airflow through the pilot fuel injectors and/or main fuel injectors;

controlling the variable geometry airflow arrangement in dependence upon airflow delivered to the combustor, the fuel flow to the pilot fuel injectors and the main fuel injectors, and a target index of soot emissions, thereby controlling airflow to the pilot fuel injectors and/or the main fuel injectors and hence the quantity of soot produced in the combustor.

In an embodiment, the target index of soot emissions is derived in dependence upon an atmospheric condition, optionally where the atmospheric condition is an atmospheric condition causative of a condensation trail, optionally where the condensation trail is a persistent condensation trail.

In an embodiment, the target index of soot emissions is derived by:

identifying a condition to the effect that an optical depth of a condensation trail produced by the engine should be either reduced or increased;

in response to identifying that the optical depth should be reduced, updating the target index of soot emissions so as to reduce ice particle formation in response to identifying that the optical depth should be increased, updating the target index of soot emissions so as to increase ice particle formation.

In an embodiment, the method further comprises responding to an increase in the target index of soot emissions by increasing the airflow through the main fuel injectors relative to the airflow through the pilot fuel injectors.

In an embodiment, the method further comprises responding to a decrease in the target index of soot emissions by decreasing the airflow through the main fuel injectors relative to the airflow through the pilot fuel injectors.

In an embodiment, the method further comprises controlling fuel flow to the pilot fuel injectors and the main fuel injectors in dependence upon the target index of soot emissions.

In an embodiment, the method further comprises responding to an increase in the target index of soot emissions during operation of both the pilot fuel injectors and the main fuel injectors by:

increasing the airflow through the main fuel injectors relative to the airflow through the pilot fuel injectors; and increasing fuel flow to the pilot fuel injectors relative to the main fuel injectors.

In an embodiment, the method further comprises responding to a decrease in the target index of soot emissions during operation of both the pilot fuel injectors and the main fuel injectors by:

decreasing the airflow through the main fuel injectors relative to the airflow through the pilot fuel injectors; and decreasing fuel flow to the pilot fuel injectors relative to the main fuel injectors.

In an embodiment, the method further comprises responding to a decrease in the target index of soot emissions during operation of only the pilot fuel injectors by:

decreasing the airflow through the main fuel injectors relative to the airflow through the pilot fuel injectors; and decreasing fuel flow to the pilot fuel injectors and introducing fuel flow to the main fuel injectors.

BRIEF DESCRIPTION OF THE DRAWINGS

Embodiments will now be described by way of example only with reference to the accompanying drawings, in which:

FIGS. 4A and 4B are charts showing the relationship between fuel flow rate and non-volatile particulate matter number at two different airflow conditions;

FIGS. 5A and 5B are charts showing the relationship between non-volatile particulate matter number and contrail optical depth at different ambient temperatures;

DETAILED DESCRIPTION OF THE DISCLOSURE

FIG. 1

Figure 1:
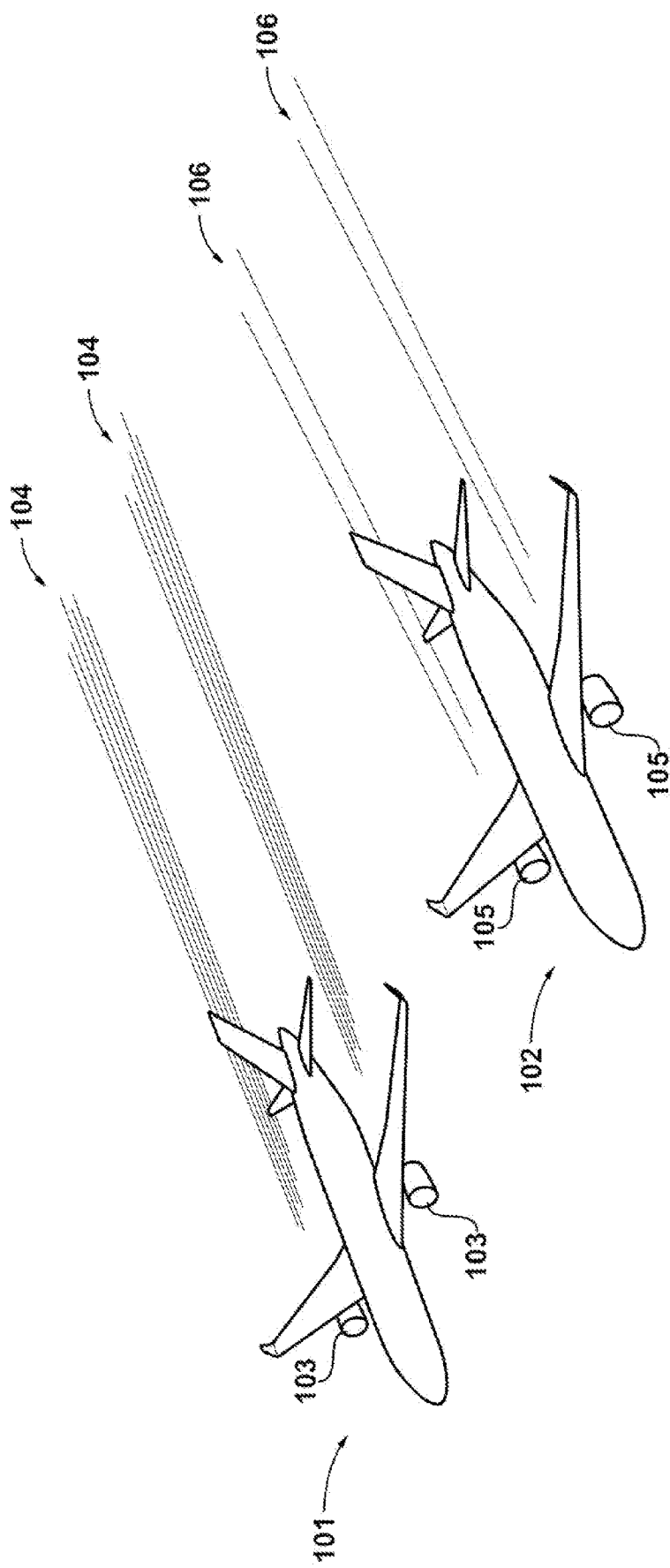
FIG. 1 shows two aircraft in flight, one of which has a pair of engines configured as set out above.

Two aircraft 101 and 102 are illustrated in FIG. 1 in formation at substantially the same flight level and in substantially the same atmospheric conditions.

The aircraft 101 and 102 are of substantially the same configuration, save for their engines. Aircraft 101 comprises two engines 103 which, due to their configuration and operating point, are forming contrails 104. Aircraft 102 comprises two engines 105 which are configured in accordance with the present invention, and are thus forming contrails 106 having a lower optical depth than contrails 104. As will be described herein, the engines 105 include functionality so as to allow the optical depth of any contrails they produce to be modified.

As used herein, optical depth is a measure of how much electromagnetic radiation, optionally in certain wavelength ranges, is prevented from travelling through a region. In the case of a contrail or ice cloud, optical depth is influenced primarily by the ice particle number density, effective ice particle radius, and the physical thickness of the cloud. Since most contrails are optically thin their radiative forcing is approximately proportional to their optical depth.

Thus, in the example of FIG. 1, a determination has been made to the effect that, in terms of climate impact, it would be preferable for any contrails produced to have a lower optical depth. In turn, therefore measures are taken within the engines 105 to reduce the optical depth of the contrails 106, so as to reduce the radiative forcing they cause.

As will also be described in further detail herein, the functionality of engines 105 is such that they may respond to the converse determination, i.e. that in terms of climate impact it would be preferable for any contrails produced to have a higher optical depth.

FIG. 2

Figure 2:
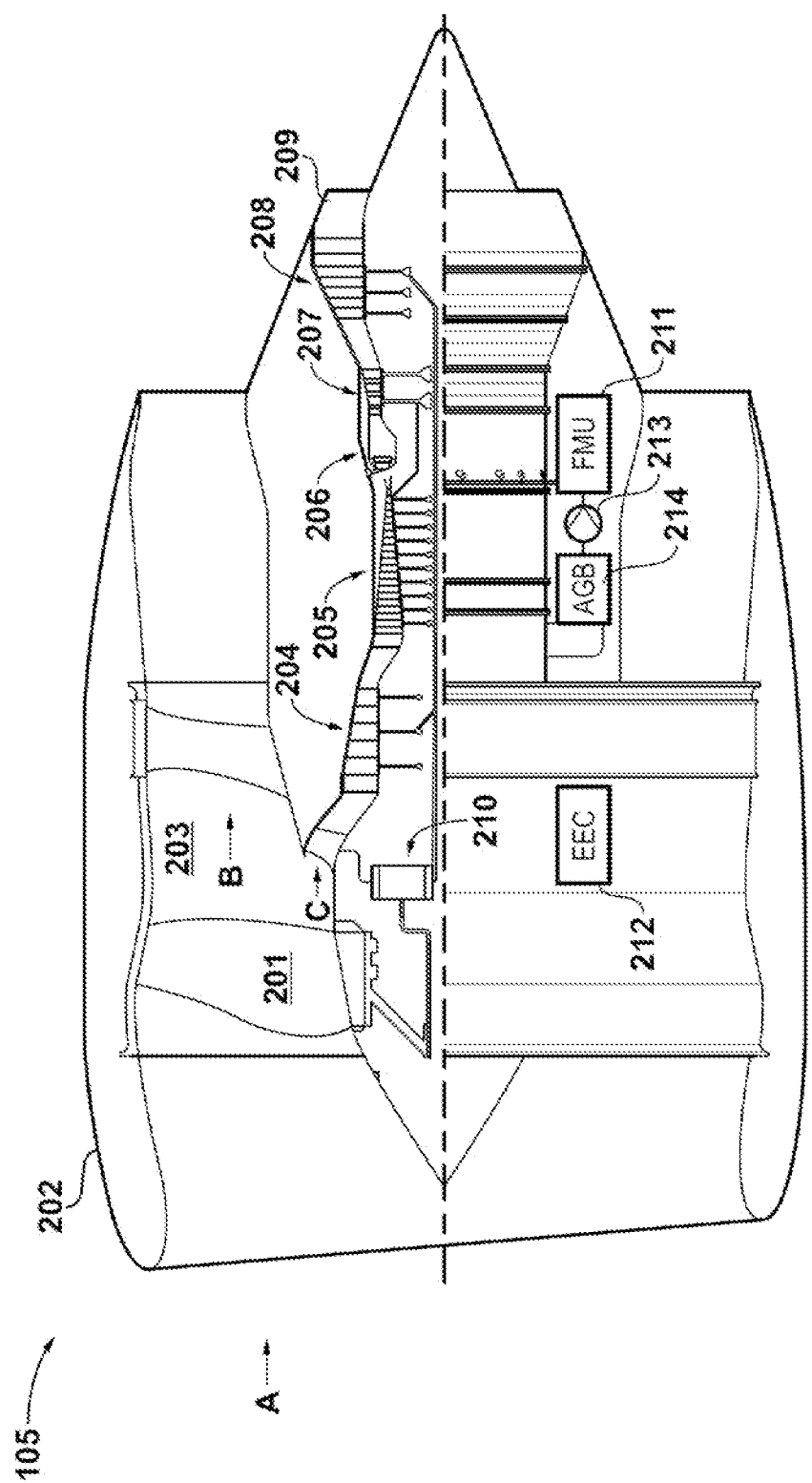
FIG. 2 shows a general arrangement of one of the engines of FIG. 1.

A general arrangement of one of the engines 105 for aircraft 102 is shown in FIG. 2.

In the present embodiment, the engine 105 is a turbofan, and thus comprises a ducted fan 201 located in a nacelle 202. The fan 201 receives intake air A and generates two airflows: a bypass flow B which passes axially through a bypass duct 203 and a core flow C which enters a core gas turbine.

The core gas turbine comprises, in axial flow series, a low-pressure compressor 204, a high-pressure compressor 205, a combustor 206, a high-pressure turbine 207, and a low-pressure turbine 208.

In operation, the core flow C is compressed by the low-pressure compressor 204 and is then directed into the high-pressure compressor 205 where further compression takes place. The compressed air exhausted from the high-pressure compressor 205 is directed into the combustor 206 where it is mixed with fuel and the mixture is combusted.

In the present embodiment, the combustor 206 is configured to utilise staged combustion to minimise emissions whilst maintaining operability at part power. To this end, it employs a rich-pilot, lean-main configuration injection system. Such combustor systems will be familiar to those skilled in the art.

Furthermore, in the present embodiment the combustor 206 is also a variable geometry combustor. As will be familiar to those skilled in the art, the term variable geometry in the context of gas turbine combustors refers to features which enable changes in airflow distribution to be made in operation. In the present embodiment, the variable geometry property of the combustor 206 is provided by a variable geometry airflow arrangement configured to vary the airflow through either or both of the pilot fuel injectors and the main fuel injectors. In this way, the respective fuel-air ratios associated with the pilot and main fuel injectors may be varied by an appropriate control scheme. This process will be described further with reference to FIGS. 4A and 4B. Examples of the variable geometry airflow arrangement will be described further with reference to FIGS. 13A, 13B, 14A and 14B.

Following combustion, the resultant hot combustion products are discharged from the combustor 206 and expand through, and thereby drive, the high-pressure turbine 207 and in turn the low-pressure turbine 208 before being exhausted via a core nozzle 209 to provide a small proportion of the overall thrust.

The fan 201 is driven by the low-pressure turbine 208 via a reduction gearbox 210. In the present embodiment, the reduction gearbox 210 takes the form of an epicyclic gearbox. In this specific embodiment, the reduction gearbox 210 is a planetary-type epicyclic gearbox and thus comprises a sun gear meshed with a plurality of planet gears located in a rotating carrier. In this example, five planet gears are provided. The planet gears are also meshed with a static ring gear. The rotating carrier is connected with the fan 201. It will be appreciated that a star-type epicyclic gearbox could be used instead, with the planet gear carrier being static and the ring gear allowed to rotate to drive the fan 201. In other embodiments, the gearbox 210 could be a layshaft-type gearbox or any other type of reduction gear. In further alternatives, the gearbox may be omitted and the engine 105 configured as a direct-drive engine, either in a two-spool or three-spool arrangement.

As described, in the present embodiment the engine 105 comprises a combustor 206. Fuel is divided amongst pilot fuel injectors and main fuel injectors by means of a fuel system controller, which in the present embodiment is provided by a fuel metering unit (FMU) 211 under control of an electronic engine controller (EEC) 212. Fuel is delivered to the fuel metering unit 211 by a fuel pump 213. In this embodiment, the fuel pump 213 is mechanically driven by an accessory gearbox 214, itself driven via a high-pressure spool radial driveshaft of known configuration (not shown).

In alternative configurations, for example in a more electric engine (MEE) configuration, the fuel pump 213 may be electrically-driven.

FIG. 3

Figure 3:
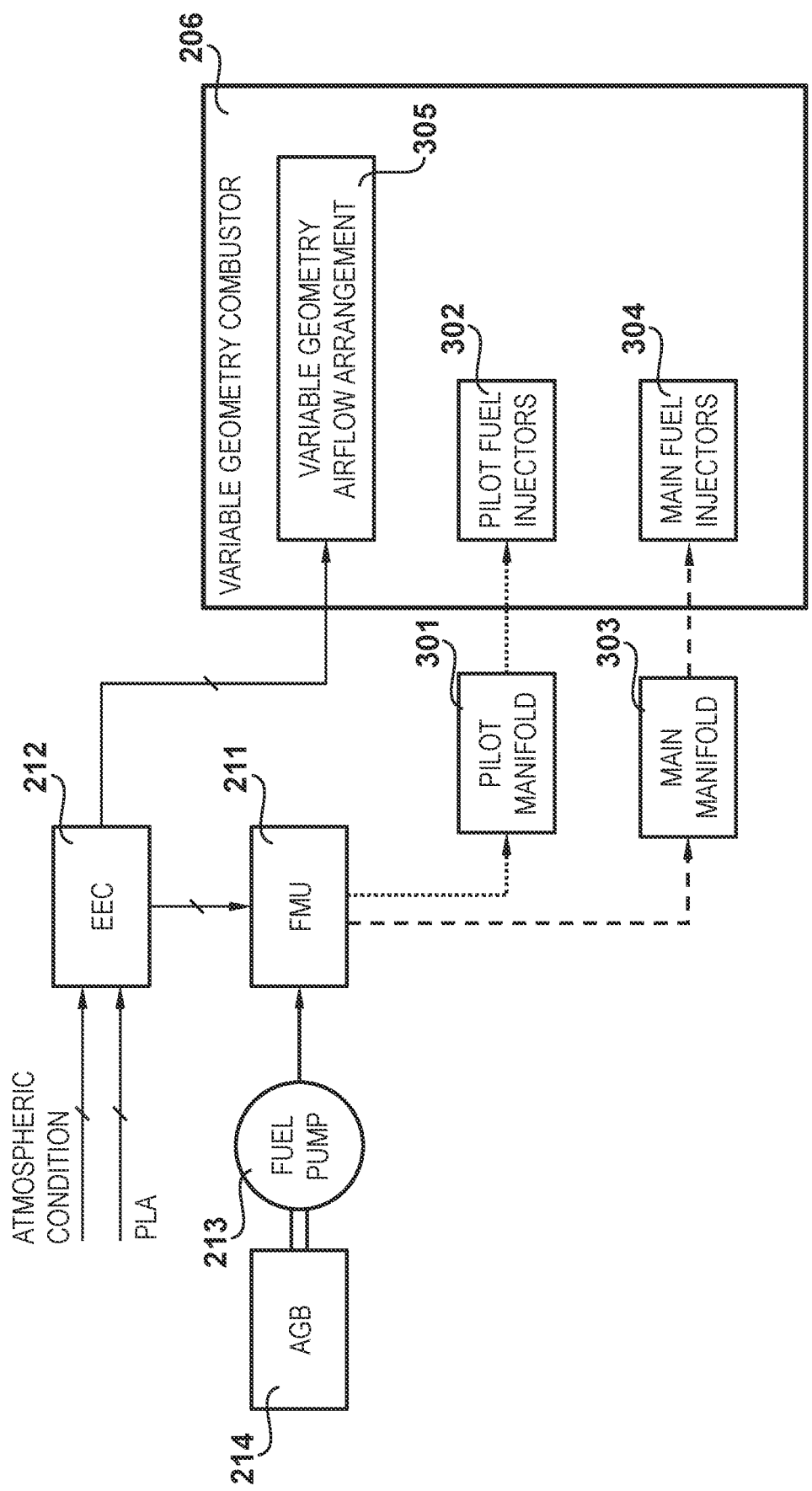
FIG. 3 shows the control scheme for the fuel injectors and the variable geometry combustor of the engine of FIG. 2.

A block diagram illustrating the control scheme for the fuel injectors and the variable geometry combustor is shown in FIG. 3.

In the present example, high-pressure fuel is delivered by the fuel metering unit 211 into a pilot manifold 301 for distribution to pilot fuel injectors 302, and a main manifold 303 for distribution to main fuel injectors 304. Delivery of fuel via the pilot fuel injectors 302 and main fuel injectors 304 is staged, thus at low powers (and hence low air mass flows) fuel is delivered by the pilot fuel injectors 302 at a rich fuel-air ratio (i at an equivalence ratio greater than unity) for improved flame stability. In the present embodiment, as power and mass flow increases, a staging point is reached at which fuel is delivered by some or all of the main fuel injectors 304, supplementing the fuel flow from the pilot fuel injectors 302. The main fuel injectors 304 are configured to inject fuel at a lean fuel-air ratio (i.e. at an equivalence ratio less than unity). At this point, airflow is such that the equivalence ratio immediately downstream of the pilot fuel injectors 302 is also fuel-lean. In the present example, at higher power levels, fuel is injected by all main fuel injectors 304.

Those skilled in the art will be familiar with such operation of staged combustion systems in order to effect lean burn at high powers whilst also observing flammability limits at lower powers.

Figure 11:
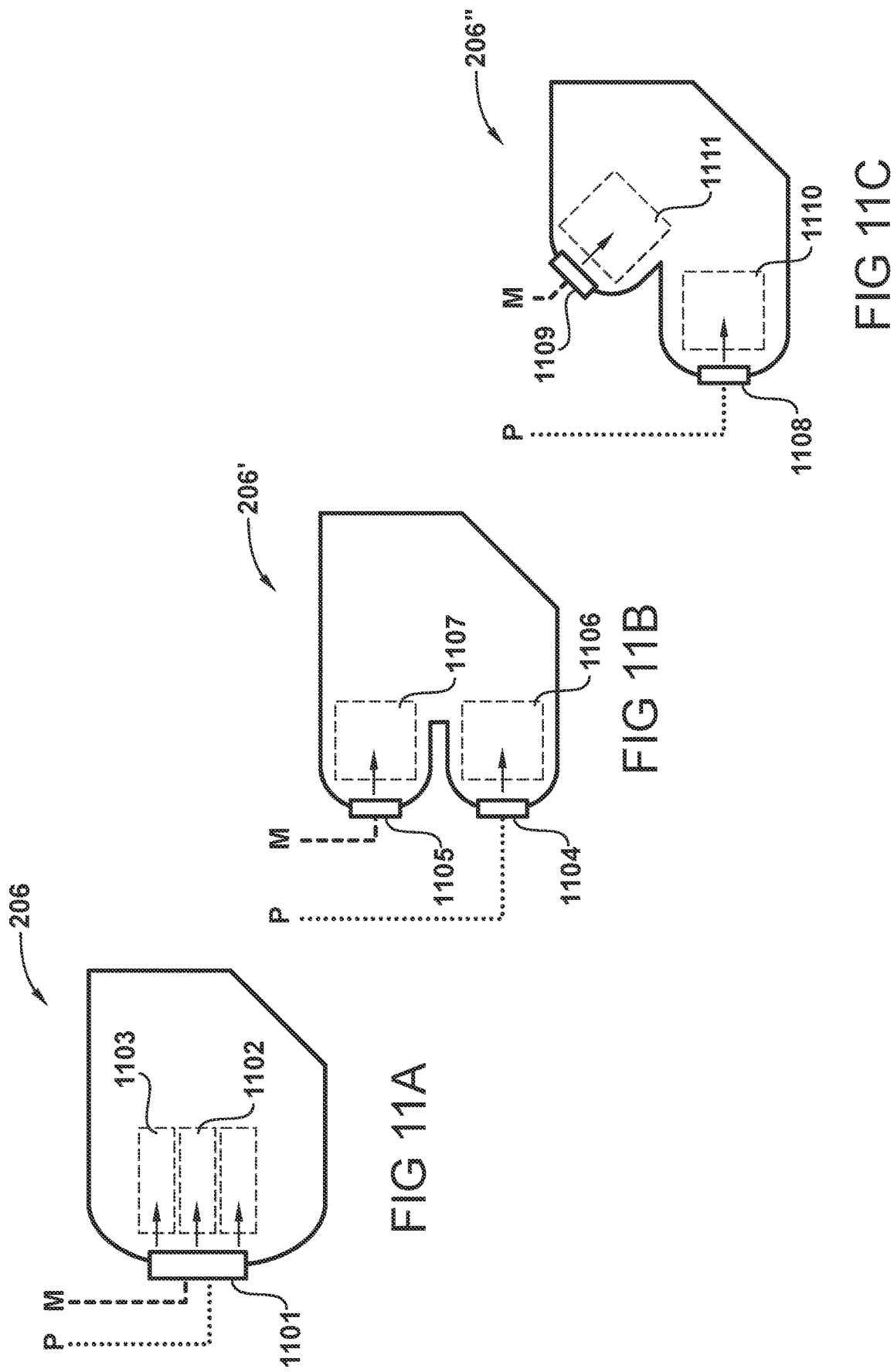
FIGS. 11A, 11B, and 11C show staged combustors with, respectively, internally-staged, parallel-staged, and series-staged configurations.
Figure 12:
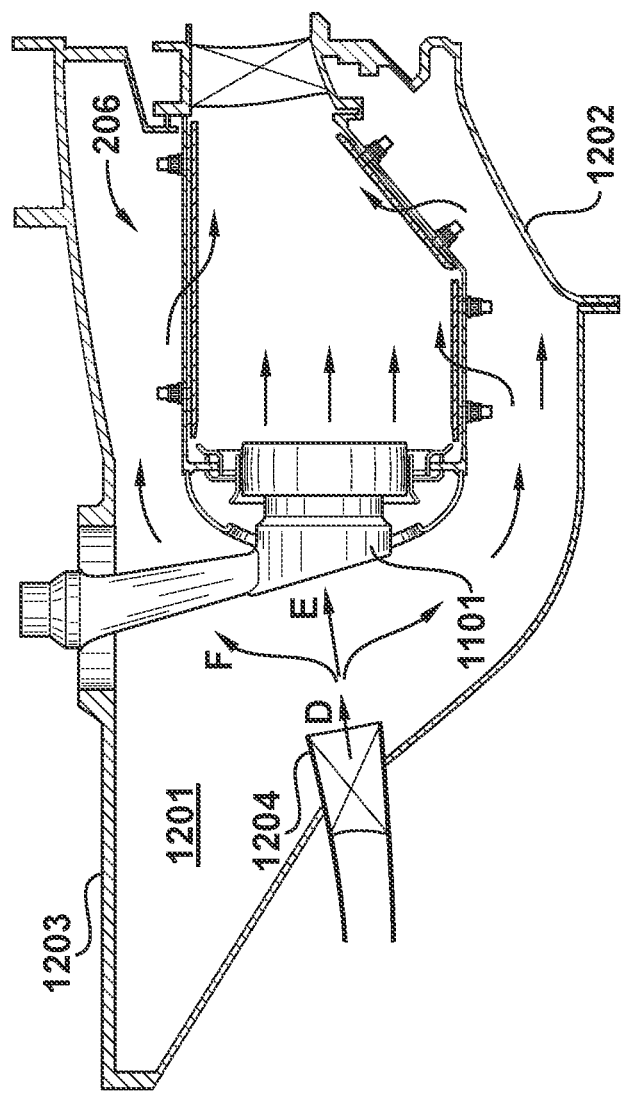
FIG. 12 shows the combustor of FIG. 11A in more detail.

Referring briefly to FIG. 11A and FIG. 12, in the present example the combustor 206 comprises duplex fuel nozzles 1101 (also known as internally-staged nozzles) in which a pilot fuel injector is integrated in the same fuel nozzle as a main fuel injector. It is envisaged that other types of staged combustion configurations may be used, for example those with separate pilot fuel injectors and main fuel injectors rather than duplex or internally-staged. Indeed, it will be understood that the principles disclosed herein may be applied to any staged combustion system comprising main fuel injectors and pilot fuel injectors.

Referring again to FIG. 3, the balance of injection of fuel by the pilot fuel injectors 302 and the main fuel injectors 304 is controlled by the electronic engine controller 212, which provides control signals to the fuel metering unit 211 indicative of the total fuel that must be injected in the form of a fuel flow rate ($W_F$) and the ratio of pilot fuel injector fuel flow to main fuel injector fuel flow. As is conventional, this is done on the basis of a control loop which derives a target fuel flow rate on the basis of a power lever angle (PLA) setting and a computed air mass flow rate into the combustor 206. The fuel metering unit 211 is configured to utilise these control signals to deliver the demanded fuel flow rate in accordance with the demanded overall fuel flow and pilot-main fuel flow ratio. In alternative embodiments, the electronic engine controller 212 may instead be configured to provide control signals to the fuel metering unit 211 which are directly indicative of the pilot fuel flow rate ($W_{Fpilot}$) and the main fuel flow rate ($W_{Fmain}$). It will of course be appreciated that the information conveyed is equivalent.

In addition to controlling the fuel metering unit 211 to a target fuel flow rate $W_F$ and pilot-main fuel flow ratio, in the present embodiment the electronic engine controller 212 is configured to control a variable geometry airflow arrangement 305 comprised in the combustor 206. As described previously, in the present embodiment the variable geometry airflow arrangement 305 is configured to vary the airflow through either or both of the pilot fuel injectors 302 and the main fuel injectors 304. In this way, for a given pilot fuel flow rate ($W_{Fpilot}$) and main fuel flow rate ($W_{Fmain}$) the pilot airflow and main airflow may be varied, hence varying the respective fuel-air ratios. To this end, in the present embodiment the variable geometry airflow arrangement 305 comprises an actuation system configured to respond to a variable geometry setting command from the electronic engine controller 212.

FIGS. 4A & 4B

As the formation of soot in aero engine combustors is primarily governed by the fuel-air ratio in the primary combustion zone, the variable geometry airflow arrangement 305 therefore allows a degree of control over the quantity of soot produced at a given fuel flow rate.

FIGS. 4A and 4B are charts showing the relationship between fuel flow rate and non-volatile particulate matter (nvPM) number. The various non-volatile particulate matter parameters are defined by the International Civil Aviation Organization. The dominant constituent of non-volatile particulate matter is soot, and so, in the present embodiments, non-volatile particulate matter number is used as the index of soot emissions, since the quantity of soot particles emitted per unit distance travelled by an aircraft has a substantial impact on contrail optical depth.

FIG. 4A shows nvPM number for lower fuel-air ratios than FIG. 4B. As can be seen in the charts, the quantity of non-volatile particulate matter emitted due to rich pilot injection is far greater than that emitted during lean main injection for the same fuel flow rate. (As noted previously, in order to maximise injection capacity, in the present example pilot fuel injectors are used in tandem with the main fuel injectors at higher power settings, however the mass flow of air into the combustion system is such that the equivalence ratio remains lean and thus the propensity for non-volatile particulate matter to be formed is much reduced.)

As may also be observed on comparison of FIG. 4A to FIG. 4B, decreasing airflow to the pilot fuel injectors or main fuel injectors, (i.e. an increase of the fuel-air ratio) results in greater non-volatile particulate matter mass and non-volatile particulate matter number.

The inventors have determined that this characteristic may be utilised to vary the non-volatile particulate matter number. Thus, in the present embodiment, the electronic engine controller 212 is configured to determine the appropriate control for the variable geometry airflow arrangement 305 using a combination of the airflow into the combustor 206, the fuel flow to the pilot fuel injectors 302 and the main fuel injectors 304, and a target index of soot emissions. In this way, the quantity of soot produced by combustion may be varied whilst respecting the power lever angle setting. In an embodiment, the target index of soot emissions is determined in dependence upon atmospheric conditions. In an embodiment, the said atmospheric conditions are those causative of contrails.

It is also contemplated that the ratio of fuel flow to the pilot fuel injectors 302 and fuel flow to the main fuel injectors 304 may be varied to modify soot production as described in co-pending U.S. patent application Ser. No. 17/189,650 and European Patent Application 21 155 907.5, both of which are currently assigned to the present applicant.

FIGS. 5A & 5B

FIGS. 5A and 5B are charts adapted from B. Kärcher and F. Yu, "Role of aircraft soot emissions in contrail formation", *Geophysical Research Letters*, vol. 36, no. 1, 2009, which is incorporated herein by reference. The charts show the dependence of contrail optical depth on nvPM number at a fixed ambient relative humidity over water. The contributing factors to the contrails' optical depth (solid) are ice particles formed from deposition on exhaust soot (dashed), and ice particles formed from emitted and/or existing ambient liquid particles (dot-dashed). FIG. 5A shows the relationship for ambient temperatures above some transition temperature ($T_{AMB} > T_{TRANS}$), and FIG. 5B shows the relationship for ambient temperatures at or below the transition temperature ($T_{AMB} \leq T_{TRANS}$)

As shown in FIG. 5A, with ambient temperatures greater than the transition temperature, and at higher nvPM numbers, exhausted non-volatile particulate matter is largely determinative of the contrail's optical depth. At lower nvPM numbers, emitted and/or existing ambient liquid particles which freeze in the exhaust plume begin to dominate the contribution to overall optical depth. As can be seen, above the transition temperature, the relationship between nvPM number and optical depth is one which is monotonically increasing.

Referring to FIG. 5B, for ambient temperatures at or below the transition temperature, a much larger number of emitted and/or existing ambient liquid particles freeze and thus lead to an increase in contrail optical depth at low nvPM numbers. It will be seen that the relationship between nvPM number and optical depth is no longer monotonic. Hence there exists a stationary point at a transition value 501.

Thus whilst an aero engine may be operating with lean combustion and thus a low rate of soot emissions, it may still be forming a contrail having greater optical depth than an engine producing substantially greater soot emissions. Depending upon other factors, this could have a more detrimental climate impact.

In the research undertaken by Kärcher and Yu referenced above, modelling suggested that there is a transition from the monotonically-increasing relationship of FIG. 5A to the non-monotonicity of FIG. 5B. As defined herein, the transition temperature $T_{TRANS}$ is, when considering a reduction in temperature, the temperature at which the relationship ceases to be monotonically increasing, with a stationary point appearing at the transition value 501.

The transition temperature for any particular ambient relative humidity over water may be determined in accordance with the modelling approach set out in B. Kärcher, U. Burkhardt, A. Bier, L. Bock and I. Ford, "The microphysical pathway to contrail formation", *Journal of Geophysical Research: Atmospheres*, vol. 120, no. 15, pp. 7893-7927, 2015, which is incorporated herein by reference.

As described with reference to FIGS. 4A and 4B, control of the fuel-air ratio for the pilot and/or main fuel injectors in a staged, variable geometry combustion system by way of a variable geometry airflow arrangement may be used to effect changes in nvPM number. This characteristic, in conjunction with the relationships between nvPM number and optical depth described with reference to FIGS. 5A and 5B, allows the electronic engine controller 212 to effect changes in optical depth.

FIG. 6

Figure 6:
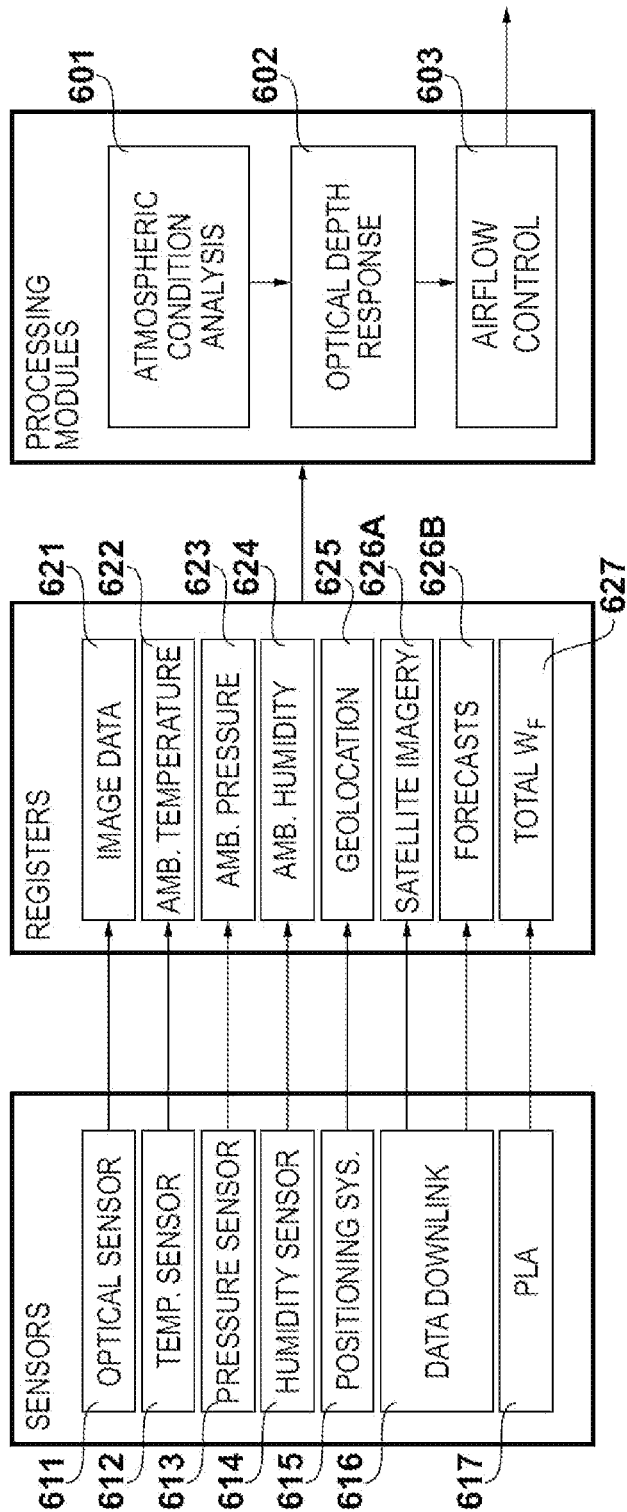
FIG. 6 shows sensor inputs, memory registers and processing modules in the electronic engine controller of the engine of FIG. 2.

A block diagram is shown in FIG. 6 that illustrates sensor inputs, memory registers and processing modules in the electronic engine controller 212 to control the variable geometry airflow arrangement 305 in accordance with a target index of soot emissions. As described previously, in the present embodiment this is performed in dependence upon atmospheric conditions.

In terms of processing functionality, in the present embodiment the electronic engine controller 212 comprises an atmospheric condition analysis module 601, an optical depth response module 602, and an airflow control module 603. The atmospheric condition analysis module 601 will be described in further detail with reference to FIG. 7. The optical depth response module 602 will be described in further detail with reference to FIGS. 8 and 9. The airflow control module 603 will be described in further detail with reference to FIG. 10.

The modules 601, 602, and 603 operate together to form an appropriate contrail optical depth response to an atmospheric condition in the form of variable geometry setting for implementation by the variable geometry airflow arrangement 305.

In a specific embodiment, a further module may be provided to effect a degree of control of the fuel metering unit 211 to achieve a target index of soot emissions, Such a module may command a change in the pilot-main fuel flow ratio by the fuel metering unit 211, in concert with the airflow control module 603.

It will be appreciated that whilst in the present embodiment the modules 601, 602 and 603 (and any other optional modules) are described as software running on the electronic engine controller 212, they may be implemented as software running on separate control units or even implemented in dedicated hardware. It will also be appreciated that some or all of the processing steps described herein for the modules 601, 602 and 603 could be carried out at a location which is physically remote from the aircraft, making use of suitable datalinks to transmit data from the aircraft to the processing location and vice versa.

In the present embodiment, each module 601, 602, and 603 is configured such that it has access to a plurality of registers storing various sensor outputs and/or downloaded data.

An optical sensor 611 is configured to produce image data 621 of the exhaust plume region of the engine 105. This facilitates analysis of the optical depth of a contrail being generated by the engine 105 during flight, and thus closed loop control of optical depth. Additionally or alternatively, other types of sensors such as lidar or radar may be used to generate data suitable for analysis of the contrail optical depth.

Various ambient condition sensors may be provided to facilitate assessment of atmospheric conditions. In the present embodiment, a temperature sensor 612 (for example, an outside air temperature probe or similar), a pressure sensor 613 (for example, an aneroid barometer forming part of a pitot-static arrangement or similar), and a humidity sensor 614 (for example, a hygrometer or similar) write to respective registers for ambient temperature 622, ambient pressure 623 (from which altitude may be derived), and ambient humidity 624.

A positioning system 615 (for example Global Positioning System, Galileo, etc.) provides geolocation data 625. A data downlink 616 (for example satellite communication) facilitates acquisition of satellite imagery 626A and weather forecasts 626B to allow identification of regions conducive to contrail formation and/or contrail persistence.

The output of a power lever angle sensor 617 in the cockpit of the aircraft 102 is converted into total fuel flow ($W_F$) demand 627 by, for example, a surrogate engine model in the electronic engine controller 212. In addition to this, the electronic engine controller 212 is configured to determine a corresponding total air mass flow quantity entering the combustor 206 ($W_{30}$) to permit calculation of fuel-air ratio, etc. The design of such control loops will be familiar to those skilled in the art.

It will be appreciated that in alternative embodiments only a subset of the sensors and registers may be selected for implementation. For example, optical sensors may be deployed and be the sole means of detection of contrail formation. Conversely, only temperature, pressure and humidity instruments may be selected for use in detection of conditions which indicate that contrails will form, and so on.

FIG. 7

Figure 7:
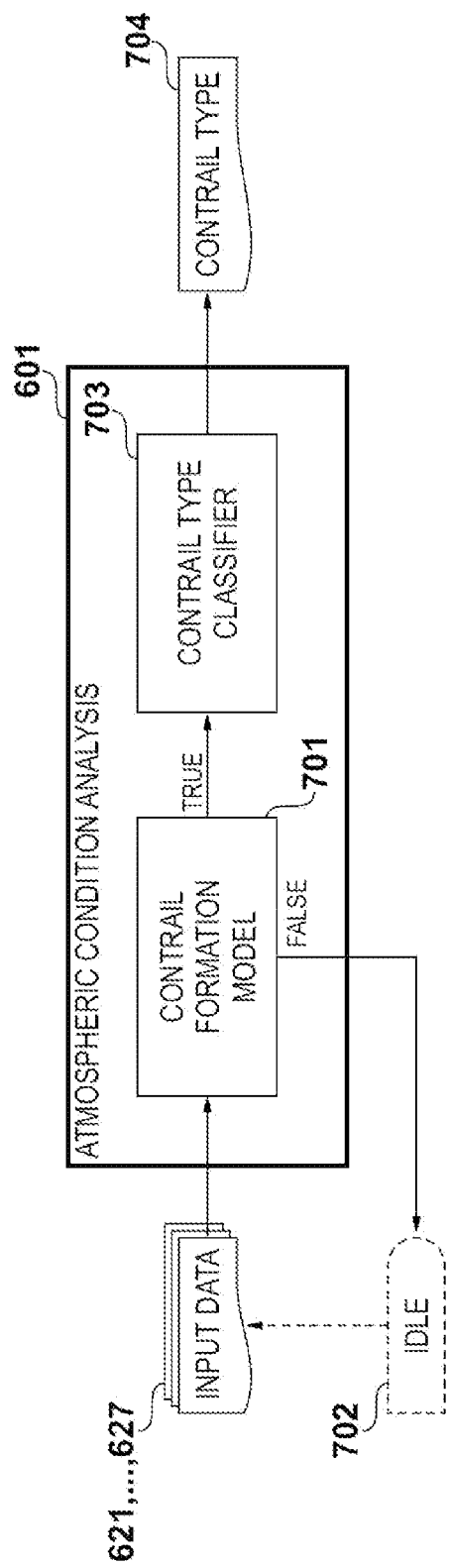
FIG. 7 shows an atmospheric condition analysis module of the processing modules of FIG. 6.
Figure 8:
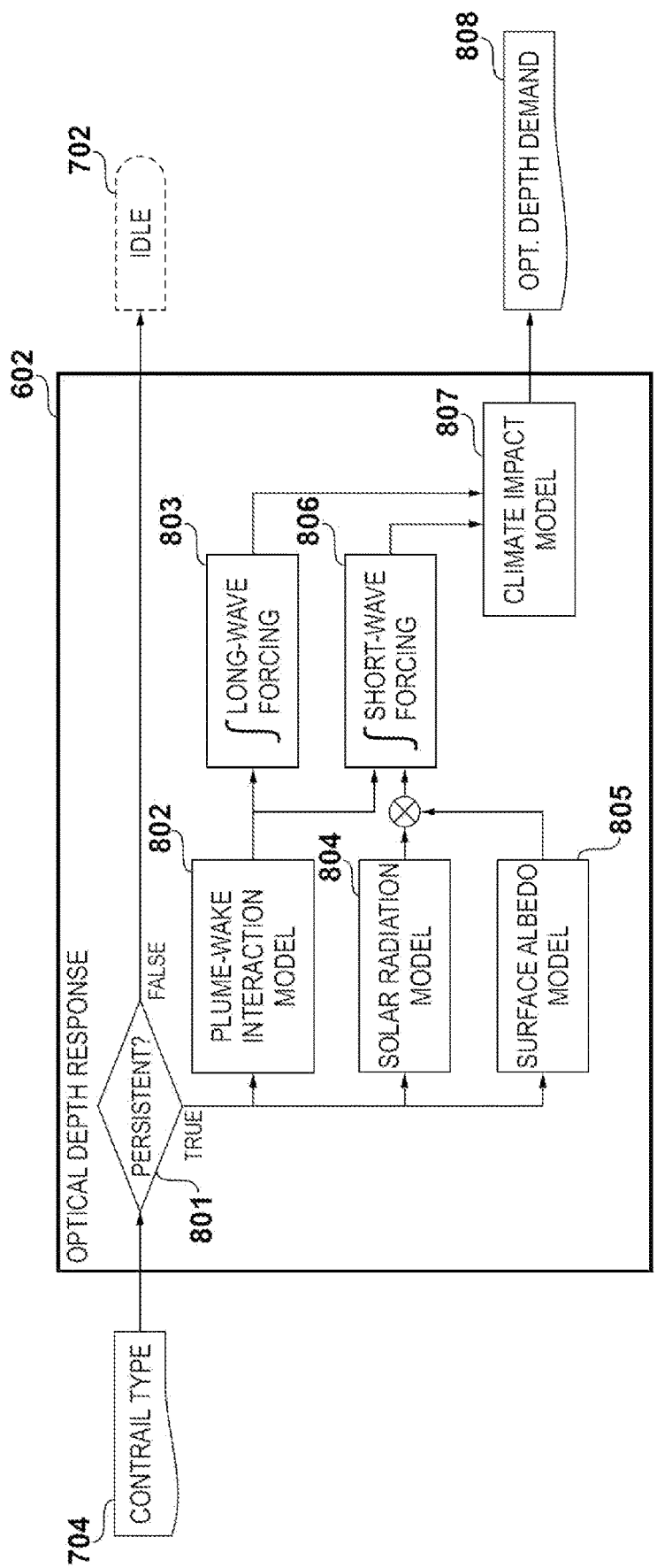
FIG. 8 shows an optical depth response module of the processing modules of FIG. 6.

The atmospheric condition analysis module 601 is shown in detail in FIG. 7.

Input data obtained from some or all of the registers 621-627 is obtained by a contrail formation model 701, The contrail formation model 701 is configured to determine whether or not contrail formation is likely under current ambient conditions and engine operating point, irrespective of subsequent persistence.

In an embodiment, the contrail formation model 701 uses the real- or near real-time atmospheric condition data measured by the sensors. For example, the measurement of ambient humidity 624 by the humidity sensor 614 may be used, or the image data 621 produced by the optical sensor 611.

In a specific embodiment, the Schmidt-Appleman criterion is applied and coupled with an assumption of a linear or approximately linear mixing trajectory in the space defined by temperature and water-vapour partial pressure. To perform this processing, the contrail formation model 701 utilises the measurements of ambient temperature 622, ambient pressure 623, and ambient humidity 624.

In an alternative embodiment, the contrail formation model 701 utilises the satellite imagery 626A and/or the weather forecasts 626B to determine whether atmospheric conditions are such that contrails will form. In a specific embodiment, the satellite imagery 626A is used in conjunction with the geolocation data 625 and an altitude reading derived from the ambient pressure 623 to confirm whether or not other aircraft in the vicinity have caused contrails or not. In a specific embodiment, the weather forecasts 626B are coupled to the Schmidt-Appleman criterion approach described above.

In the present embodiment, if the contrail formation model 701 determines that no contrail will form given current atmospheric conditions, then no action is taken and the atmospheric condition analysis module 601 proceeds to an idle process 702 where it waits until new input data are available.

If the contrail formation model 701 determines that a contrail will form, then control proceeds to a contrail type classifier 703 which is configured to determine, given ambient conditions, whether the contrail will persist or not. This may be achieved by assessing the ambient relative humidity with respect to ice: if the ambient air is supersaturated with respect to ice, then the contrail will persist. The output of the contrail type classifier 703 is the determined contrail type 704, and is provided to the optical depth response module 602.

FIG. 8

The optical depth response module 602 receives the determined contrail type 704 from the atmospheric condition analysis module 601, and proceeds to ask a question at a decision block 801 as to whether the contrail will be persistent, or not.

If this question is answered in the affirmative, then several models are invoked to assess the optimal response in terms of adjustments to the optical depth of the contrail.

A plume-wake interaction model 802 is provided which assesses the effect of the wake of the aircraft 102 on the exhaust plume of the engine 105. This model will be described in further detail with reference to FIG. 9. In the present embodiment, the model 802 outputs a set of predictions of the time-varying properties of a plurality of contrails, each caused by exhaust plumes having different nvPM numbers. The output of model 802 is provided to a long-wave forcing model 803, which is configured to determine the time-integrated radiative forcing per unit length of each contrail due to long-wave (i.e. warming) effects over their expected lifetimes. In addition to model 802, a solar radiation model 804 and a surface albedo model 805 are executed and their outputs combined. The solar radiation model 804 is configured to determine the strength and orientation of incoming sunlight over the expected lifetime of the contrail in the post-vortex regime. The surface albedo model 805 is configured to determine the albedo of surfaces (including other clouds) which would receive incoming sunlight in the absence of a contrail formed by the aircraft. In the present embodiment, models 804 and 805 utilise the satellite imagery 626A and weather forecast data 626B to perform this assessment.

The combined output of models 804 and 805 are supplied, along with the output of model 802, to a short-wave forcing model 806 which is configured to determine the time-integrated radiative forcing due to short-wave (i.e. cooling) effects over the expected lifetime of the predicted set of contrails generated by the model 802.

The outputs of the long-wave forcing model 803 and the short-wave forcing model 806 are supplied to a climate impact model 807 which determines the optimal optical depth to achieve the best balance between the magnitudes of the modelled short-wave cooling and long-wave warming effects.

In this way, in the present embodiment the model 807 determines that the optical depth of the condensation trail should be increased or decreased on the basis of a time-integrated effect of a persistent contrail over its lifespan given a current atmospheric condition and a predicted future atmospheric condition. The output of model 807 is an optical depth demand 808, which is supplied to the airflow control module 603. The optical depth demand 808 is a target optical depth for the contrail.

In practice, therefore, the target index of soot emissions is derived by identifying a condition to the effect that an optical depth of a condensation trail produced by the engine should be either reduced or increased. In response to identifying that the optical depth should be reduced, the target index of soot emissions is updated so as to reduce ice particle formation. In response to identifying that the optical depth should be increased, the target index of soot emissions is updated so as to increase ice particle formation.

In the present embodiment, the climate impact model 807 is configured to consider short-wave cooling to be a desirable effect, and long-wave warming to be an undesirable effect, and thus tends to produce an optical depth demand 808 which reduces the net warming impact of the contrail.

In the present example, if the question asked at decision block 801 is answered in the negative, then the idle process 702 is invoked until new input data are available. In alternative embodiments, measures may still be taken to alter the optical depth, possibly adopting a similar approach to that for persistent contrails,

FIG. 9

Figure 9:
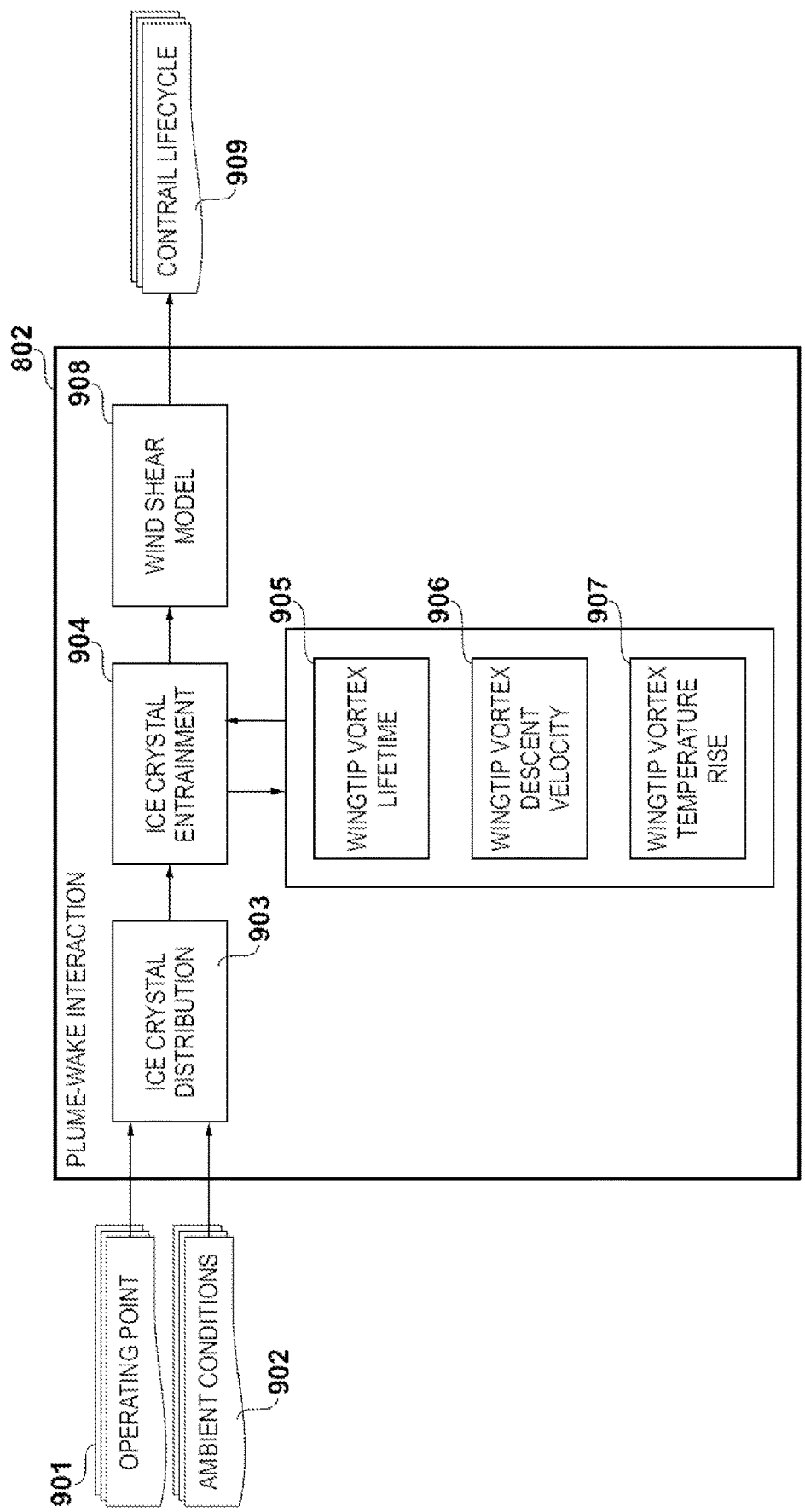
FIG. 9 shows a plume-wake interaction model of the optical depth response module of FIG. 8.

The plume-wake interaction model 802 is shown in more detail in FIG. 9.

The model 802.

The model 802 obtains input data pertaining to, in particular, the operating point 901 of the engine 105 (for example intake temperature and pressure, power lever angle setting, overall fuel flow rate, etc.) and the ambient conditions 902 at the current location of the aircraft 102 (for example ambient temperature 622, ambient pressure 623, ambient humidity 624, etc.).

These input data are supplied to an ice crystal distribution model 903, which is configured to determine, for each of a plurality of possible nvPM numbers, the initial particle size distribution of ice particles formed in the exhaust plume of the engine 105. In the present embodiment, this is performed on the basis of factors including ambient temperature 622, ambient pressure 623, ambient humidity 624, the mass of water vapour emitted by the engine per unit distance of travel, and the efficiency of the engine 105. In this example the ice crystal distribution model 903 is configured to determine the mass of water vapour using the data pertaining to engine operating point 901, i.e. power lever setting, fuel flow rate, fuel properties, calculated airspeed, etc.

The ice crystal distributions are supplied to an ice crystal entrainment model 904, which is configured to determine the extent to which particles in the engine exhaust become captured by wingtip vortices of the aircraft 102.

This is modelled because a significant proportion of ice crystals which would otherwise form a persistent contrail may be destroyed by heating in the vortices, thereby reducing the optical depth of the contrail.

The ice crystal entrainment model 904 is configured to determine the particle size distribution of ice particles initially captured within the wingtip vortex core, given an initial particle size distribution of a newly formed contrail, in dependence upon the location of the corresponding engine relative to the wingtip. It is further configured to determine the number or ratio of ice particles which remain after the adiabatic heating experienced within the wingtip vortex core during the lifetime of the wingtip vortex. The remaining ice particles also include those ice particles which were detrained from the vortex prior to its breakup.

In order to model this effect, the ice crystal entrainment model 904 calls upon one or more other models. In this example, a wingtip vortex lifetime model 905 is configured to determine the lifetime of a wingtip vortex in dependence upon such factors as the strength of ambient turbulence, the rate of change of ambient temperature with altitude, and/or the instantaneous aircraft weight (e.g. taking account of the amount of fuel burned so far during the flight). A vortex descent velocity model 906 is configured to determine the downward velocity of a wingtip vortex, in dependence upon factors including the instantaneous aircraft weight, and aircraft configuration. A vortex temperature rise model 907 is configured to determine the temperature change likely to be experienced within the vortex core as a result of the determined change in altitude during its descent and/or the speed of its descent.

It is contemplated that further models could be provided, for example a model from which can be determined the proportion, of those ice particles not captured/retained by the wingtip vortex core, which experience sufficient adiabatic heating in the region of downwash between the aircraft's wingtip vortices so as to be eliminated.

The output of ice crystal entrainment model 904 is then supplied to a wind shear model 908 which predicts the degree of horizontal spreading of the contrail over its expected lifetime. This prediction is performed using the vertical extent of the post-vortex contrail, and current and future weather conditions obtained from the weather forecasts 6268, This is performed to account for the contrail's short- and long-wave effects.

The output from the plume-wake interaction model 802 is thus a set of contrail lifecycle data 909 for a plurality of nvPM numbers.

FIG. 10

Figure 10:
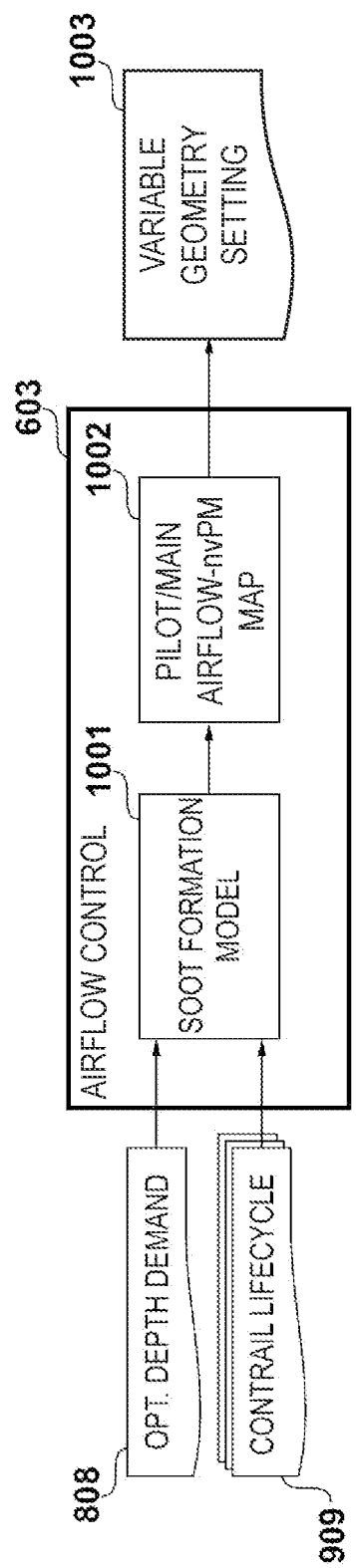
FIG. 10 shows an airflow control module of the processing modules of FIG. 6.

The airflow control module 603 is shown in greater detail in FIG. 10.

Initially, the optical depth demand 808 is supplied to a soot formation model 1001. Model 1001 is configured to determine a target nvPM number under the current ambient atmospheric conditions, in particular the ambient temperature, which will meet the optical depth demand 808. In the present embodiment, this is achieved by use of the contrail lifecycle data 909.

In an alternative embodiment, the model 1001 may implement a microphysical simulation to establish the target nvPM number.

This target nvPM number is then used as a set point for evaluating appropriate values for airflow to the pilot fuel injectors and the main fuel injectors. In the present embodiment, a map 1002 is used, allowing an efficient lookup of the appropriate settings for the variable geometry airflow arrangement 305 to produce the requisite fuel-air ratios for the pilot fuel injector 302 and the main fuel injector 304 to achieve a target nvPM number, given an overall airflow rate into the combustor 206 and overall fuel flow rate $W_F$. In an alternative embodiment, a surrogate model may be implemented to model the combustion process based on real time parameters. Further, use of these data permits the airflow control module 603 to output the appropriate variable geometry setting in accordance with the mode of operation of the stage combustion system, i.e. whether or not the staging point has been reached.

As shown in FIGS. 5A and 5B, the relationship between optical depth and nvPM effectively splits into two regimes: one (FIG. 5A) above a transition temperature where there is a generally monotonic relationship between nvPM and optical depth, and another (FIG. 5B) at or below the transition temperature where the minimum optical depth is found at the transition value 501, with both a decrease and an increase in nvPM number resulting in optical depth increasing.

Hence the airflow control module 603 controls the variable geometry airflow arrangement by taking these different regimes into account.

In functional terms, the airflow control module 603 compares a newly-received optical depth demand 808 with the current value thereof. Thus the airflow control module 603 determines whether the optical depth of a contrail should be reduced, or increased.

If the optical depth demand 808 is such that the optical depth of a contrail should be reduced, the airflow control module 603 evaluates a variable geometry setting 1003 that varies nvPM number (and thus soot production) to minimise ice particle formation.

The use of the soot formation model 1001 and map 1002 effectively compares a measurement of ambient temperature to the transition temperature. Then, if the ambient temperature is greater than the transition temperature, a pilot-main fuel flow ratio is determined that, if possible, decreases soot production to achieve the target optical depth. It will be appreciated that if the lowest possible level of soot production has already been reached, then the variable geometry setting 1003 will remain the same.

If the ambient temperature is less than or equal to the transition temperature, a variable geometry setting 1003 is determined that either decreases or increases soot production. This is performed in dependence upon whether the current variable geometry setting 1003, and hence nvPM number, is above or below the transition value 501. The minimum optical depth that may be achieved is that obtained when the variable geometry setting 1003 corresponds to the transition value 501.

If the optical depth demand 808 is such that the optical depth of a contrail should be increased, the airflow control module 603 evaluates a variable geometry setting 1003 that varies nvPM number (and thus soot production) to increase ice particle formation.

The effect of the airflow control module's configuration is then to obtain a measurement of ambient temperature.

If the ambient temperature is greater than the transition temperature, a variable geometry setting 1003 is determined that increases soot production to achieve the target optical depth.

If the ambient temperature is less than or equal to the transition temperature, and the current variable geometry setting 1003 corresponds to an nvPM number that is greater than the transition value 501, then a variable geometry setting 1003 is determined that increases the index of soot emissions.

If the ambient temperature is less than or equal to the transition temperature, and the current variable geometry setting 1003 corresponds to an nvPM number that is less than or equal to the transition value 501, then a variable geometry setting 1003 is determined that decreases the index of soot emissions In some embodiments, the decision as to whether to increase or decrease nvPM number to increase optical depth may be influenced by which operational change is associated with, for example, the lowest fuel consumption. In alternative embodiments, other parameters may influence this decision, such as emissions of unburnt hydrocarbons, oxides of nitrogen, or even impact on life-limited parts, etc.

In the present embodiment in which airflow is controlled independently of pilot-main fuel flow ratio, the map 1002 in airflow control module 603 causes the following responses to various scenarios as set out in Table 1:

TABLE 1

| | Target nvPM Number | |
|---|---|---|
| | Decrease | Increase |
| Response | Decrease main airflow relative to pilot | Increase main airflow relative to pilot |

As described previously, in an alternative embodiment, it is possible for a further module in the electronic engine controller 212 to change the pilot-main fuel flow ratio using the fuel metering unit 211 in addition to the airflow using the variable geometry airflow arrangement 305. The combination of this functionality provides the following responses to various operational scenarios as set out in Table 2:

TABLE 2

| | | Target nvPM Number | |
|---|---|---|---|
| | | Decrease | Increase |
| Operation relative to staging point | Below (Pilot only) | Decrease main airflow relative to pilot<br>Decrease pilot fuel flow and introduce mains fuel flow | Increase main airflow relative to pilot<br>No change to pilot or main fuel flow |
| | Above (Pilot plus main) | Decrease main airflow relative to pilot<br>Decrease pilot fuel flow relative to main- | Increase main airflow relative to pilot<br>Increase pilot fuel flow relative to main |

FIGS. 11A, 118 & 11C

Example configurations of the combustor 206 are shown in FIGS. 11A, 11B and 11C.

As described previously, in the present embodiment, the combustor 206 is configured to implement staged combustion using an internally-staged fuel nozzle 1101 as illustrated in FIG. 11A. The fuel nozzle 1101 comprises both a pilot fuel injector 302 and a main fuel injector 304. In the present embodiment, the main fuel injector 304 is concentric around the pilot fuel injector 302. Thus, in this configuration, fuel P from the pilot manifold 301 is supplied to the pilot fuel injector 302 for delivery into a first, inner combustion zone 1102, whilst fuel M from the main manifold 303 is supplied to the main fuel injector 304 for delivery into a second, outer combustion zone 1103.

As described previously, however, it is contemplated that the principles of the present invention may be applied to other approaches to staged combustion, for example those that use separate pilot and main fuel injectors.

One example of an alternative embodiment of the combustor 206' is shown in FIG. 11B, in which the combustor 206' is configured as a parallel-staged combustor. In this embodiment, a first fuel nozzle 1104 comprises a pilot fuel injector 302, and a distinct second fuel nozzle 1105 comprises a main fuel injector 304. The pilot fuel injector 302 is configured to deliver fuel P from the pilot fuel manifold 301 into a first combustion zone 1106 and the main fuel injector 304 is configured to deliver fuel M from the main manifold 303 into a second combustion zone 1107. The second combustion zone 1107 is radially offset from the first combustion zone 1106; and in this specific embodiment the second combustion zone 1107 is radially outward from the first combustion zone 1106 with respect to the engine centreline.

Another example of an alternative embodiment of the combustor 206" is shown in FIG. 11C; in which the combustor 206" is configured as a series-staged combustor. In this embodiment, a first fuel nozzle 1108 comprises the pilot fuel injector 302, and a distinct second fuel nozzle 1109 comprises the main fuel injector 304. The pilot fuel injector 302 is configured to deliver fuel P from the pilot fuel manifold 301 into a first combustion zone 1110 and the main fuel injector 304 is configured to deliver fuel M from the main manifold 303 into a second combustion zone 1111. The second combustion zone 1111 is axially offset from the first combustion zone 1111, and in this specific embodiment the second combustion zone 1111 is axially downstream of the first combustion zone 1110 with respect to airflow through the engine.

With reference to Table 1, a decrease in target nvPM number will be met by a decrease in airflow through the main fuel injectors 304 relative to airflow through the pilot fuel injectors 302. In this way, the fuel-air ratio in the first combustion zones 1102;1106;1110 will be decreased, leading to a locally leaner mixture and hence a decrease in soot formation. The fuel-air ratio in the second combustion zones 1103;1107;1111 will be increased, leading to slower flame quenching and increased soot burn-off. The combination of decreased soot formation and increased soot burn-off leads to a net decrease in nvPM number in the products of combustion.

Conversely, an increase in target nvPM number will be met by an increase in airflow through the main fuel injectors 304 relative to airflow through the pilot fuel injectors 302. In this way, the fuel-air ratio in the first combustion zones 1102;1106;1110 will be increased, leading to a locally richer mixture and hence an increase in soot formation. The fuel-air ratio in the second combustion zones 1103;1107; 1111 will be decreased, leading to faster flame quenching and a reduction in soot burn-off. The combination of increased soot formation and decreased soot burn-off leads to a net increase in nvPM number in the products of combustion.

As described previously it is possible to vary the pilot-main fuel flow ratio in addition to varying airflow through the pilot and main fuel injectors. In such an implementation, the following effects will occur.

With reference to Table 2, a decrease in target nvPM number during operation of only the pilot fuel injectors 302 will be met by a decrease in airflow through the main fuel injectors 304 relative to airflow through the pilot fuel injectors 302. A decrease in fuel flow P to the pilot fuel injectors 302 will also be commanded along with the introduction of a complementary fuel flow M to the main fuel injectors 304. In this way, the fuel-air ratio in the first combustion zones 1102;1106;1110 will be decreased due to decreased fuel flow and increased airflow. The fuel-air ratio in the second combustion zones 1103;1107;1111 will be increased due to the introduction of fuel flow at decreased airflow. Alteration of the fuel flow rates P and M in this way can enable the same net decrease in nvPM number to be achieved with a smaller change to the relative airflows through the pilot and main fuel injectors.

An increase in target nvPM number during operation of only the pilot fuel injectors 302 will simply continue to be met by an increase in airflow through the main fuel injectors 304 relative to airflow through the pilot fuel injectors 302, as the fuel flow M to the main fuel injectors 304 is zero. This will increase the fuel-air ratio in the first combustion zones 1102;1106;1110 and hence increase soot formation.

A decrease in target nvPM number during operation of both the pilot fuel injectors 302 and the main fuel injectors 304 will be met by a decrease in airflow through the main fuel injectors 304 relative to airflow through the pilot fuel injectors 302, along with a decrease in fuel flow P to the pilot fuel injectors 302 relative to the fuel flow M to the main fuel injectors 304. In this way, the fuel-air ratio in the first combustion zones 1102;1106;1110 will be decreased due to decreased fuel flow and increased airflow. The fuel-air ratio in the second combustion zones 1103;1107;1111 will be increased due to increased fuel flow and decreased airflow. Alteration of the fuel flow rates P and M in this way can enable the same net decrease in nvPM number to be achieved with a smaller change to the relative airflows through the pilot and main fuel injectors.

An increase in target nvPM number during operation of both the pilot fuel injectors 302 and the main fuel injectors 304 will be met by an increase in airflow through the main fuel injectors 304 relative to airflow through the pilot fuel injectors 302, along with an increase in fuel flow P to the pilot fuel injectors 302 relative to the fuel flow M to the main fuel injectors 304. In this way, the fuel-air ratio in the first combustion zones 1102;1106;1110 will be increased due to increased fuel flow and decreased airflow. The fuel-air ratio in the second combustion zones 1103; 1107:1111 will be decreased due to decreased fuel flow and increased airflow. Alteration of the fuel flow rates P and M in this way can enable the same net increase in nvPM number to be achieved with a smaller change to the relative airflows through the pilot and main fuel injectors.

In a specific embodiment, the electronic engine controller 212 is configured to vary airflow and fuel flows in such a manner that the fuel-air ratio in the first combustion zones 1102;1106;1110 may be varied independently of the fuel-air ratio in the second combustion zones 1103;1107;1111.

FIG. 12

A section through the combustor 206 is shown in FIG. 12. The combustor 206 is mounted within a cavity 1201 formed by an inner air casing 1202 and outer air casing 1203.

In operation, the high-pressure compressor 205 delivers high-pressure air to the cavity 1201 via a diffuser 1204. At this point, a quantity of the air enters the combustor 206 as combustion air E through the fuel nozzle 1101 and/or mixing ports at the entrance to the combustor 206. The remaining air flows around the combustor 206 as cooling air F, some of which may be admitted downstream of the fuel nozzle 1101 to cool the liner of the combustor 206 and/or as dilution air prior to entering the high-pressure turbine 207, etc.

In a conventional fixed geometry combustion system, the sizing of ports remains fixed and hence the relative proportion of combustion air E and cooling air F remains fixed throughout the operational envelope. Further, in a staged combustion system, the geometry of the pilot fuel injectors 302 and the main fuel injectors 304 also remains fixed. Hence the apportionment of combustion air for the pilot fuel injectors 302 $E_P$ is fixed relative to the combustion air for the main fuel injectors 304 $E_M$. At a given airflow D and a given overall fuel flow rate $W_F$, therefore, the fuel-air ratio for the pilot fuel injectors 302 and main fuel injectors 304 is essentially fixed. It will be appreciated that, in addition to combustor 206 of FIG. 11A, this characteristic is also common to combustors 206' and 206" of FIGS. 11B and 11C respectively.

As described previously, in the present embodiment the combustor 206 is a variable geometry combustor and comprises a variable geometry airflow arrangement 305 to vary the airflow through the pilot fuel injectors 302 and/or the main fuel injectors 304. In this way, the fuel-air ratio for the pilot fuel injectors 302 and main fuel injectors 304 may be varied by the electronic engine controller 212 to achieve a target index of soot emissions.

FIGS. 13A & 13B

Figure 13A:
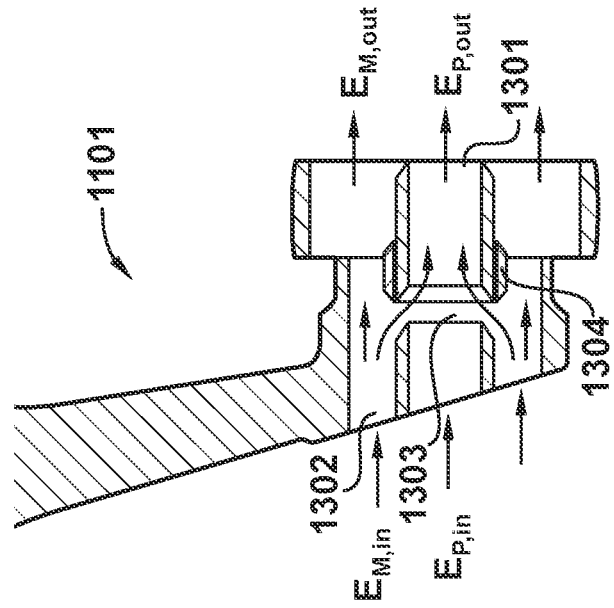
FIGS. 13A and 13B show the fuel nozzle of the combustor of FIG. 11A.
Figure 13B:
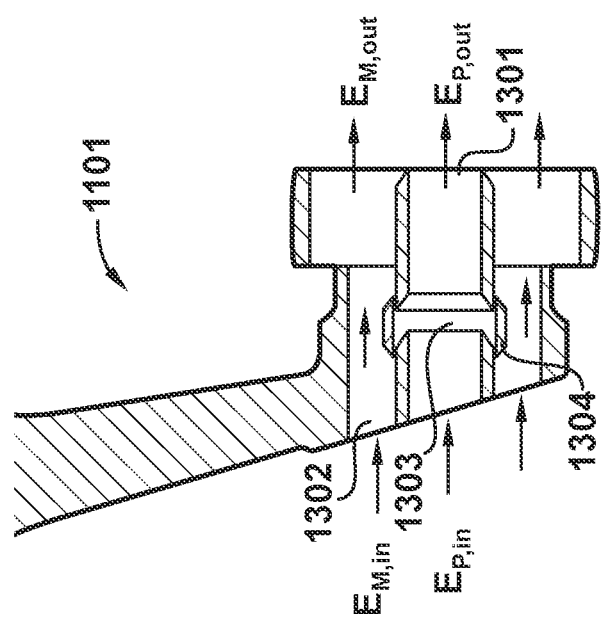

FIGS. 13A and 13B illustrate an embodiment of the variable geometry airflow arrangement 305 in which it is comprised in the fuel nozzle 1101. A section of the fuel nozzle 1101 is shown in the Figures, with an inner duct 1301 for admitting inlet pilot combustion air $E_{P,in}$ and a concentric outer duct 1302 for admitting inlet main combustion air $E_{M,in}$. For clarity, details of the pilot and main fuel injectors' fuel circuits are omitted but it will be appreciated that in practice they would be configured and arranged to deliver pilot fuel P and main fuel M for mixing with outlet pilot combustion air $E_{P,out}$ and outlet main combustion air $E_{M,out}$ respectively.

In the illustrated embodiment, the inner duct 1301 comprises an aperture 1303 with a translatable collar 1304 arranged to vary the area of the aperture 1303. In the present embodiment the translatable collar is translatable by way of a lever arm driven by a shaft, in turn driven by a unison ring arrangement (none shown). Such arrangements are described in U.S. Pat. No. 5,664,412, which is assigned to the present applicant, and incorporated herein by reference. Other actuation systems may be utilised, for example other mechanical arrangements, or pneumatic or hydraulic pistons, for example.

As illustrated in FIG. 13A, the collar 1304 is located so as to close the aperture 1303. The collar may translate axially so as to open the aperture 1303. In this way, a portion of inlet main combustion air $E_{M,in}$ is encouraged to flow into the inner duct 1301. In this way, the quantity of outlet pilot combustion air $E_{P,out}$ may be increased relative to the quantity of outlet main combustion air $E_{M,out}$, even at fixed inlet conditions. It will be appreciated that in other embodiments, different variable geometry airflow arrangements may be employed, for example to vary the area of the inlet to either or both of the inner duct 1301 and outer duct 1302.

In operation, at constant fuel flow rates to the pilot fuel injectors 302 and main fuel injectors 304, the variable geometry airflow arrangement 305 will vary the respective fuel-air ratios so as to vary soot production.

FIGS. 14A & 14B

As described previously, it is contemplated that rather than internally-staged fuel nozzles 1101, the pilot fuel injectors 302 and main fuel injectors 304 may be housed within separate fuel nozzles, such as in the embodiments of FIGS. 11B and 11C.

In such a configuration, either one or both types of fuel nozzles may comprise the variable geometry airflow arrangement 305. For example, in the context of the embodiment of FIG. 11B, the fuel nozzle 1104 may be a variable geometry fuel nozzle and hence comprises the variable geometry airflow arrangement 305. Alternatively, the fuel nozzle 1105 may be a variable geometry fuel nozzle and hence comprises the variable geometry airflow arrangement 305. Alternatively, both the fuel nozzle 1104 and the fuel nozzle 1105 may be variable geometry fuel nozzles and hence comprise the variable geometry airflow arrangement 305.

Figure 14A:
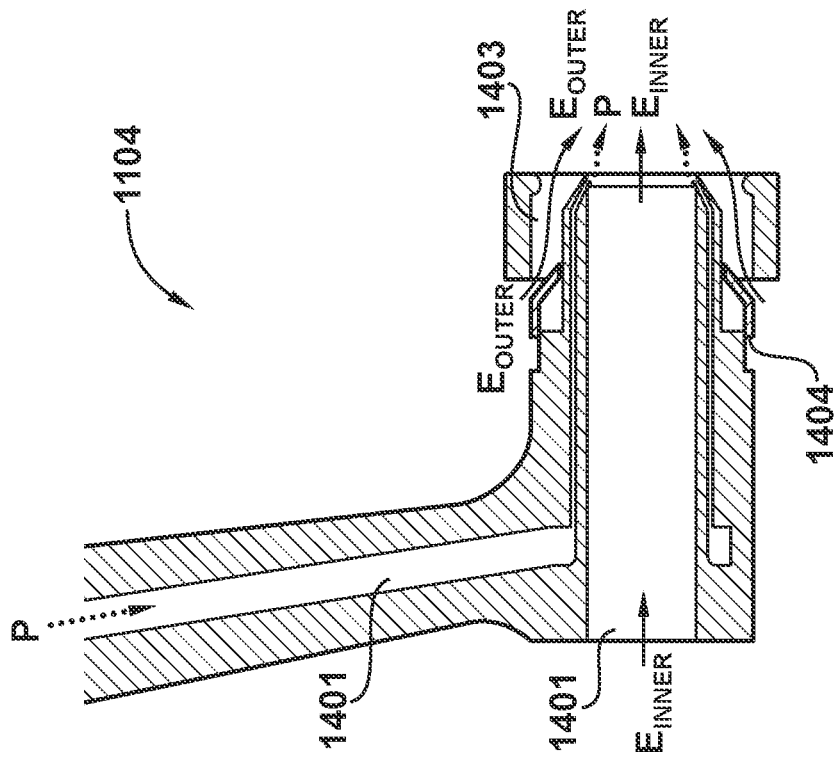
FIGS. 14A and 14B show a fuel nozzle of the combustor of FIG. 11B.
Figure 14B:
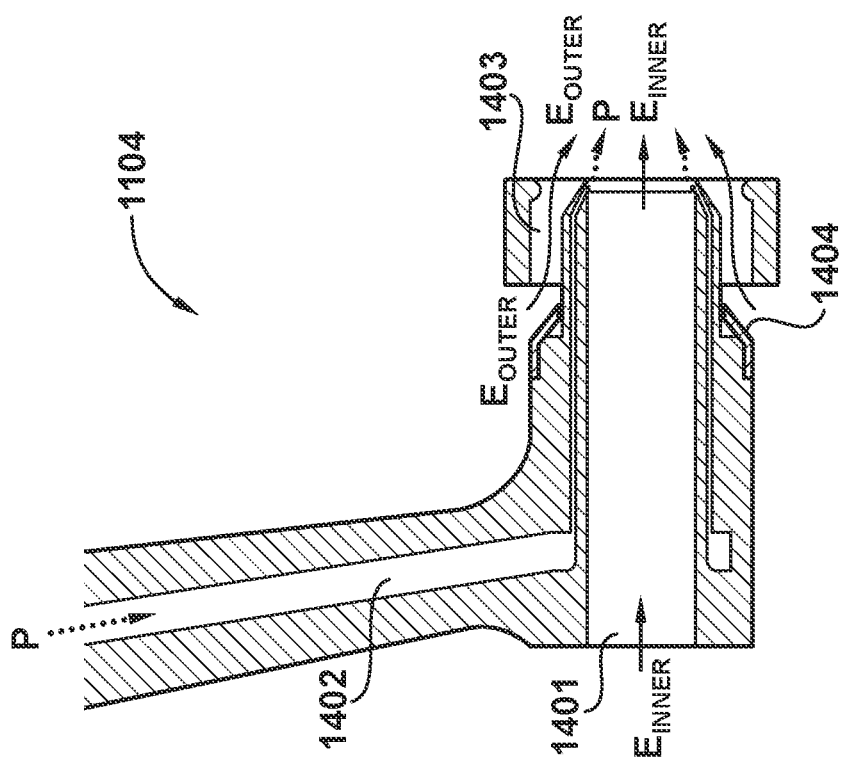

A section of the fuel nozzle 1104 is shown in FIGS. 14A and 14B. It will be appreciated that this configuration may be applied to fuel nozzle 1105 as an alternative or in addition. Further, it will be appreciated that the configuration may be utilised in the embodiment of FIG. 11C for fuel nozzle 1108 and/or fuel nozzle 1109.

As shown in FIGS. 14A and 14B, the fuel nozzle 1104 comprises an inner duct 1401 for admitting a portion of combustion air $E_{INNER}$ and delivering it to the combustor 206'. Close to the outlet of the inner duct 1401, fuel—in this particular example pilot fuel P—is delivered into the airflow via a fuel circuit 1402. Further airflow $E_{OUTER}$ is delivered into the combustor 206' via an outer duct 1403 concentric with the inner duct 1401.

In the illustrated embodiment, the fuel nozzle 1104 comprises a translatable ramp 1404 to provide the variable geometry function, which ramp is configured to move axially to vary the inlet area of the outer duct 1403—note the difference in inlet area between FIG. 14A and FIG. 14B. The mechanism for effecting this axial motion may operate in a similar way to collar 1304. Other mechanisms may be employed, for example a variable area inlet to inner duct 1401.

In operation, the ramp 1404 moves axially in accordance with the current variable geometry setting to vary the amount of airflow $E_{OUTER}$, and hence the total airflow through the fuel nozzle 1104.

It will be appreciated that the system configuration disclosed herein may also lend itself for use in controlling nvPM parameters during different phases of flight, for example in the landing and take-off cycles. In such a context, the target index of soot emissions may be derived on the basis of visibility limits, local air quality limits, etc.

It will also be appreciated that other functionality may be enabled by the system configuration disclosed herein, for example improvements in extinction margin during transients, particularly during operation of only the pilot fuel injectors 302.

Various examples have been described, each of which comprise various combinations of features. It will be appreciated by those skilled in the art that, except where clearly mutually exclusive, any of the features may be employed separately or in combination with any other features and the invention extends to and includes all combinations and sub-combinations of one or more features described herein.

We claim:

1. A gas turbine engine comprising:
   a variable geometry combustor having pilot fuel injectors and main fuel injectors;
   a fuel meter configured to control fuel flow to the pilot fuel injectors and the main fuel injectors;
   a variable geometry airflow arrangement for the variable geometry combustor, which is configured to vary the airflow through the pilot fuel injectors and/or the main fuel injectors; and
   a control system configured to control the variable geometry airflow arrangement in dependence upon airflow delivered to the combustor, the fuel flow to the pilot fuel injectors and the main fuel injectors, and a target index of soot emissions, thereby controlling airflow through the pilot fuel injectors and/or the main fuel injectors and hence the quantity of soot produced by combustion,
   wherein the control system is configured to respond to a decrease in the target index of soot emissions by controlling the variable geometry airflow arrangement to decrease the airflow through the main fuel injectors relative to the airflow through the pilot fuel injectors.

2. The gas turbine engine of claim 1, in which the control system is configured to derive the target index of soot emissions in dependence upon an atmospheric condition which is causative of a condensation trail.

3. The gas turbine engine of claim 2, in which the control system is configured to derive the target index of soot emissions by:
   identifying a condition to the effect that an optical depth of a condensation trail produced by the engine should be either reduced or increased;
   in response to identifying that the optical depth should be reduced, updating the target index of soot emissions so as to reduce ice particle formation; and
   in response to identifying that the optical depth should be increased, updating the target index of soot emissions so as to increase ice particle formation.

4. The gas turbine engine of claim 1, in which the control system is configured to respond to an increase in the target index of soot emissions by controlling the variable geometry airflow arrangement to increase the airflow through the main fuel injectors relative to the airflow through the pilot fuel injectors.

5. The gas turbine engine of claim 1, in which the control system is further configured to control the fuel meter to effect changes in the fuel flow to the pilot fuel injectors and the main fuel injectors in dependence upon the target index of soot emissions.

6. The gas turbine engine of claim 5, in which the control system is configured to respond to an increase in the target index of soot emissions during operation of both the pilot fuel injectors and the main fuel injectors by:
controlling the variable geometry airflow arrangement to increase the airflow through the main fuel injectors relative to the airflow through the pilot fuel injectors; and
controlling the fuel meter to increase fuel flow to the pilot fuel injectors relative to the main fuel injectors.

7. The gas turbine engine of claim 5, in which the control system is configured to respond to the decrease in the target index of soot emissions during operation of both the pilot fuel injectors and the main fuel injectors by:
controlling the variable geometry airflow arrangement to decrease the airflow through the main fuel injectors relative to the airflow through the pilot fuel injectors; and
controlling the fuel meter to decrease fuel flow to the pilot fuel injectors relative to the main fuel injectors.

8. The gas turbine engine of claim 5, in which the control system is configured to respond to the decrease in the target index of soot emissions during operation of only the pilot fuel injectors by:
controlling the variable geometry airflow arrangement to decrease the airflow through the main fuel injectors relative to the airflow through the pilot fuel injectors; and
controlling the fuel meter to decrease fuel flow from the pilot fuel injectors and introduce fuel flow to the main fuel injectors.

9. The gas turbine engine of claim 1, in which the pilot fuel injectors are variable geometry pilot fuel injectors and comprise the variable geometry airflow arrangement, whereby variation of the airflow through the pilot fuel injectors varies the airflow through the main fuel injectors.

10. The gas turbine engine of claim 1, in which the main fuel injectors are variable geometry main fuel injectors and comprise the variable geometry airflow arrangement, whereby variation of the airflow through the main fuel injectors varies the airflow through the pilot fuel injectors.

11. The gas turbine engine of claim 1, in which the pilot fuel injectors are variable geometry pilot fuel injectors and the main fuel injectors are variable geometry main fuel injectors, whereby the pilot fuel injectors and the main fuel injectors comprise the variable geometry airflow arrangement.

12. The gas turbine engine of claim 1, comprising a plurality of duplex fuel nozzles, each one of which comprises one of the pilot fuel injectors and one of the main fuel injectors.

13. The gas turbine engine of claim 1, in which the combustor is a parallel staged combustor in which the pilot fuel injectors are configured to inject fuel into a first combustion zone and the main fuel injectors are configured to inject fuel into a second combustion zone radially offset from the first combustion zone, or the combustor is a series staged combustor in which the pilot fuel injectors are configured to inject fuel into a first combustion zone and the main fuel injectors are configured to inject fuel into a second combustion zone axially offset from the first combustion zone.

14. A method of controlling an index of soot emissions of a gas turbine combustor, comprising:

providing pilot fuel injectors for rich combustion and main fuel injectors for lean combustion in said combustor;
providing a variable geometry airflow arrangement for varying the airflow through the pilot fuel injectors and/or main fuel injectors;
controlling the variable geometry airflow arrangement in dependence upon airflow delivered to the combustor, the fuel flow to the pilot fuel injectors and the main fuel injectors, and a target index of soot emissions, thereby controlling airflow to the pilot fuel injectors and/or the main fuel injectors and hence the quantity of soot produced in the combustor; and
responding to a decrease in the target index of soot emissions by decreasing the airflow through the main fuel injectors relative to the airflow through the pilot fuel injectors.

15. The method of claim 14, in which the target index of soot emissions is derived in dependence upon an atmospheric condition.

16. The method of claim 15, in which the target index of soot emissions is derived by:
identifying a condition to the effect that an optical depth of a condensation trail produced by the engine should be either reduced or increased;
in response to identifying that the optical depth should be reduced, updating the target index of soot emissions so as to reduce ice particle formation; and
in response to identifying that the optical depth should be increased, updating the target index of soot emissions so as to increase ice particle formation.

17. The method of claim 14, further comprising responding to an increase in the target index of soot emissions by increasing the airflow through the main fuel injectors relative to the airflow through the pilot fuel injectors.

18. The method of claim 14, further comprising controlling fuel flow to the pilot fuel injectors and the main fuel injectors in dependence upon the target index of soot emissions.

19. A gas turbine engine comprising:
a variable geometry combustor having pilot fuel injectors and main fuel injectors;
a fuel meter configured to control fuel flow to the pilot fuel injectors and the main fuel injectors;
a variable geometry airflow arrangement for the variable geometry combustor, which is configured to vary the airflow through the pilot fuel injectors and/or the main fuel injectors; and
a control system configured to control the variable geometry airflow arrangement in dependence upon airflow delivered to the combustor, the fuel flow to the pilot fuel injectors and the main fuel injectors, and a target index of soot emissions, thereby controlling airflow through the pilot fuel injectors and/or the main fuel injectors and hence the quantity of soot produced by combustion,
wherein the control system is configured to respond to an increase in the target index of soot emissions by controlling the variable geometry airflow arrangement to increase the airflow through the main fuel injectors relative to the airflow through the pilot fuel injectors.

* * * * *